United States Patent
Je et al.

(10) Patent No.: US 10,616,898 B2
(45) Date of Patent: Apr. 7, 2020

(54) APPARATUS AND METHOD FOR MITIGATING INTERFERENCE IN WIRELESS COMMUNICATION SYSTEM

(71) Applicant: Samsung Electronics Co., Ltd., Suwon-si, Gyeonggi-do (KR)

(72) Inventors: Hui-Won Je, Gwacheon-si (KR); Dong-Sik Kim, Pohang-si (KR); Joon-Sung Kim, Hwaseong-si (KR); Young-Seok Jung, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 195 days.

(21) Appl. No.: 15/643,684

(22) Filed: Jul. 7, 2017

(65) Prior Publication Data
US 2018/0070365 A1    Mar. 8, 2018

(30) Foreign Application Priority Data
Sep. 7, 2016 (KR) .................. 10-2016-0115295

(51) Int. Cl.
*H04W 72/08* (2009.01)
*H04L 5/00* (2006.01)
*H04W 56/00* (2009.01)

(52) U.S. Cl.
CPC ......... *H04W 72/082* (2013.01); *H04L 5/0007* (2013.01); *H04L 5/0032* (2013.01); *H04L 5/0048* (2013.01); *H04L 5/0073* (2013.01); *H04W 56/001* (2013.01); *H04L 5/0053* (2013.01)

(58) Field of Classification Search
CPC ... H04L 5/0007; H04L 5/0032; H04L 5/0048; H04L 5/0051; H04L 5/0053; H04L 5/006; H04W 56/001; H04W 72/082
See application file for complete search history.

(56) References Cited

U.S. PATENT DOCUMENTS

| 8,811,550 | B2 | 8/2014 | Corona et al. | |
|---|---|---|---|---|
| 8,873,683 | B2 | 10/2014 | Balraj et al. | |
| 8,996,049 | B2* | 3/2015 | Nishio | H04B 7/0615 |
| | | | | 455/507 |
| 9,253,658 | B2* | 2/2016 | Sadek | H04W 52/367 |
| 9,270,347 | B2* | 2/2016 | Fong | H04B 7/024 |

(Continued)

FOREIGN PATENT DOCUMENTS

| CA | 3020227 A1 * | 11/2017 | ............ H04W 88/08 |
|---|---|---|---|
| EP | 2684401 A1 * | 1/2014 | .......... H04W 52/243 |

(Continued)

*Primary Examiner* — Eric Nowlin
(74) *Attorney, Agent, or Firm* — Harness, Dickey & Pierce, P.L.C.

(57) ABSTRACT

A chipset is provided. The chipset is configured to detect an interference characteristic of a neighbor cell corresponding to groups and perform an interference whitening operation based on the interference characteristic. The groups are generated by dividing a time interval occupied by a first reference signal region by dividing a frequency band occupied by the first reference signal region, or by dividing a time interval occupied by a second reference signal region. A frequency band occupied by the second reference signal region is wider than the frequency band occupied by the first reference signal region.

20 Claims, 20 Drawing Sheets

(56) References Cited

U.S. PATENT DOCUMENTS

| | | | | |
|---|---|---|---|---|
| 9,473,282 B2* | 10/2016 | Nishio | | H04B 7/0615 |
| 9,548,849 B1* | 1/2017 | Nishio | | H04B 7/0615 |
| 9,571,242 B2* | 2/2017 | Balraj | | H04L 5/0032 |
| 9,596,043 B2* | 3/2017 | Yang | | H04W 24/08 |
| 9,609,641 B2* | 3/2017 | Kakishima | | H04J 11/00 |
| 9,667,309 B2* | 5/2017 | Sano | | H04W 16/28 |
| 9,888,484 B2* | 2/2018 | Fong | | H04B 7/024 |
| 9,967,890 B2* | 5/2018 | Li | | H04W 72/082 |
| 2007/0263576 A1* | 11/2007 | Deguchi | | H04L 27/2608 |
| | | | | 370/338 |
| 2011/0275396 A1* | 11/2011 | Nishio | | H04B 7/0615 |
| | | | | 455/509 |
| 2013/0039203 A1* | 2/2013 | Fong | | H04B 7/024 |
| | | | | 370/252 |
| 2013/0308480 A1* | 11/2013 | Wigren | | H04B 1/7097 |
| | | | | 370/252 |
| 2013/0343219 A1* | 12/2013 | Kronander | | H04W 52/243 |
| | | | | 370/252 |
| 2014/0036805 A1* | 2/2014 | Sadek | | H04W 52/367 |
| | | | | 370/329 |
| 2014/0321296 A1* | 10/2014 | Balraj | | H04L 5/0032 |
| | | | | 370/252 |
| 2015/0131472 A1* | 5/2015 | Nishio | | H04B 7/0615 |
| | | | | 370/252 |
| 2015/0245362 A1* | 8/2015 | Li | | H04W 72/082 |
| | | | | 370/329 |
| 2015/0282133 A1* | 10/2015 | Kakishima | | H04J 11/00 |
| | | | | 370/329 |
| 2015/0333854 A1* | 11/2015 | Yang | | H04W 24/08 |
| | | | | 370/252 |
| 2015/0372851 A1* | 12/2015 | Kakishima | | H04W 56/00 |
| | | | | 370/329 |
| 2016/0174235 A1* | 6/2016 | Fong | | H04B 7/024 |
| | | | | 370/329 |
| 2016/0191115 A1* | 6/2016 | Sano | | H04W 16/28 |
| | | | | 375/144 |
| 2017/0005771 A1* | 1/2017 | Nishio | | H04B 7/0615 |
| 2017/0324455 A1* | 11/2017 | Soriaga | | H04W 76/10 |
| 2018/0035316 A1* | 2/2018 | Kim | | H04L 1/20 |

FOREIGN PATENT DOCUMENTS

| | | | | |
|---|---|---|---|---|
| KR | 20180012039 A | * | 2/2018 | H04L 1/20 |
| WO | WO-2012125088 A1 | * | 9/2012 | H04W 52/243 |
| WO | WO-2017196604 A1 | * | 11/2017 | H04W 88/08 |

* cited by examiner

APPARATUS AND METHOD FOR MITIGATING INTERFERENCE IN WIRELESS COMMUNICATION SYSTEM

CROSS-REFERENCE TO RELATED APPLICATION(S)

This application claims priority under 35 U.S.C. § 119(a) to a Korean Patent Application No. 10-2016-0115295, filed in the Korean Intellectual Property Office, on Sep. 7, 2016, the entire disclosure of each of which is hereby incorporated by reference.

TECHNICAL FIELD

The present disclosure relates to apparatuses and/or methods for mitigating interference in a wireless communication system, and more particularly, to an apparatuses and/or methods for mitigating interference based on reference signal grouping in a wireless communication system.

BACKGROUND

In a wireless communication system, various schemes for enhancing system performance have been proposed. One of the various schemes proposed for enhancing system performance is a scheme of mitigating interference.

Various schemes of mitigating interference have been proposed, and a typical one is an interference whitening scheme is a typical example. For example, an interference whitening scheme used in a long-term evolution (LTE) mobile communication system will be described below. For convenience, the interference whitening scheme used in the LTE mobile communication system will be referred to as LTE interference whitening scheme.

An LTE interference whitening scheme is a scheme of detecting statistical characteristics (e.g., a variance matrix of an interference signal (IS) using a plurality of samples such as a reference signal (RS) (e.g., a common reference signal (CRS), or a demodulation reference signal (DMRS), and mitigating an interference signal based on, for example, a minimum mean square error (MMSE) scheme. For example, interference signal measurement for an RS (e.g., CRS, or DMRS) may be mainly performed on a sub-frame basis because the interference signal measurement for the RS may be performed on a sub-frame basis is that a base station (BS) allocates a resource on a sub-frame basis in the LTE mobile communication system.

Recently, in the LTE mobile communication system, a case that synchronization difference among transmitted signals of BSs in one terminal is equal to or greater than several symbols due to various parameters (e.g., network delay among the BSs, or signal transmission delay according to distance difference per BS), which frequently occurs in an actual field, are newly recognized as an issue.

In a case that synchronization difference among transmitted signals of BSs in one terminal is equal to or greater than several symbols, if an interference is measured on a sub-frame basis like in the LTE interference whitening scheme, the measured interference may be inaccurate. Thus, severe reception performance degradation may occur on data by interference signals not synchronized due to the inaccurate interference measurement.

A scheme of effectively mitigating interference in a wireless communication system is desired.

The above information is presented as background information only to assist with an understanding of the present disclosure. No determinations and no assertions are made as to whether any of the above might be applicable as prior art with regard to the present disclosure.

SUMMARY

Some example embodiments relate to apparatuses and/or methods for addressing at least the above-mentioned problems and/or disadvantages and to provide at least the advantages described below. Accordingly, example embodiments provide apparatuses and/or methods for mitigating interference in a wireless communication system.

Some example embodiments relate to apparatuses and/or methods for mitigating interference based on RS grouping in a wireless communication system.

Some example embodiments relate to apparatuses and/or methods for mitigating interference based on IS synchronization in a wireless communication system.

According to an example embodiment, a chipset may be configured to detect an interference characteristic of a neighbor cell corresponding to groups and perform an interference whitening operation based on the interference characteristic. The groups may be generated by dividing a time interval occupied by a first reference signal region by dividing a frequency band occupied by the first reference signal region, or by dividing a time interval occupied by a second reference signal region. A frequency band occupied by the second reference signal region may be wider than the frequency band occupied by the first reference signal region.

According to an example embodiment, an operating method of an apparatus for mitigating interference may include detecting an interference characteristic of a neighbor cell corresponding to groups and performing an interference whitening operation based on the interference characteristic. The groups may be generated by dividing a time interval occupied by a first reference signal region by dividing a frequency band occupied by the first reference signal region, or by dividing a time interval occupied by a second reference signal region. A frequency band occupied by the second reference signal region may be wider than the frequency band occupied by the first reference signal region.

According to an example embodiment, a chipset for mitigating interference may include a memory configured to store at least one of computer-readable instructions or computer-readable data, and at least one processor configured to execute the computer-readable instructions such that the at least one processor is configured to divide a time interval occupied by a first reference signal region by one of dividing a frequency band occupied by the first reference signal region or dividing a time interval occupied by a second reference signal region to generate groups, a second frequency band occupied by the second reference signal region being wider than a first frequency band occupied by the first reference signal region, detect an interference characteristic of a neighbor cell corresponding to the groups, and perform an interference whitening operation based on the interference characteristic.

BRIEF DESCRIPTION OF THE DRAWINGS

The above and other aspects, features and advantages of certain example embodiments of the present disclosure will be more apparent from the following description taken in conjunction with the accompanying drawings, in which.

Throughout the drawings, it should be noted that like reference numbers are used to depict the same or similar elements, features, and/or structures.

DETAILED DESCRIPTION

Figure 1A:
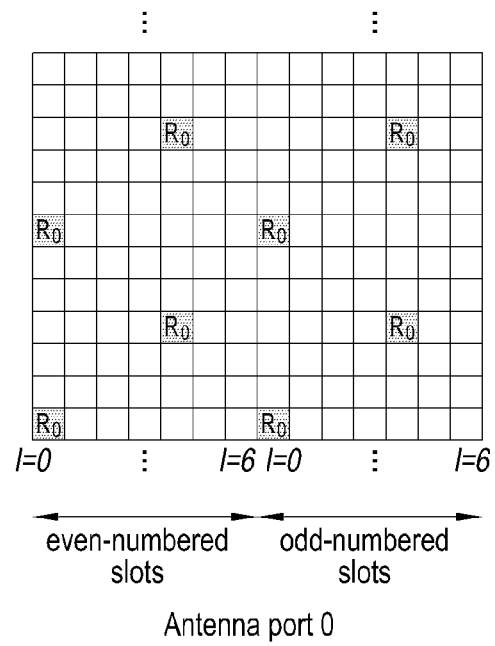
FIG. 1A schematically illustrates a CRS in a case that one antenna port is used in an LTE mobile communication system according to an example embodiment of the present disclosure.

The following description with reference to the accompanying drawings is provided to assist in a comprehensive understanding of various example embodiments of the present disclosure as defined by the claims and their equivalents. It includes various specific details to assist in that understanding but these are to be regarded as merely examples. Accordingly, those of ordinary skill in the art will recognize that various changes and modifications of the various example embodiments described herein can be made without departing from the scope and spirit of the present disclosure. In addition, descriptions of well-known functions and constructions may be omitted for clarity and conciseness.

According to various example embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic accessory, an electronic tattoo, or a smart watch), and/or the like.

According to various example embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, or an electronic picture frame.

According to various example embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, or an industrial or consumer robot.

According to various example embodiments of the present disclosure, an electronic device may be furniture, part of a building/structure, an electronic board, electronic signature receiving device, a projector, or various measuring devices (e.g., water, electricity, gas or electro-magnetic wave measuring devices) that include communication functionality.

According to various example embodiments of the present disclosure, an electronic device may be any combination of the foregoing devices. It is apparent to one having ordinary skill in the art that an electronic device according to various example embodiments of the present disclosure is not limited to the foregoing devices.

According to various example embodiments of the present disclosure, a transmitting apparatus may be a terminal or a base station (BS). Here, the terminal may be implemented with one chipset.

According to various example embodiments of the present disclosure, a receiving apparatus may be a terminal or a BS.

According to various example embodiments of the present disclosure, for example, a terminal may be an electronic device.

In various example embodiments of the present disclosure, a term "terminal" may be interchangeable with a term "mobile station (MS)", "user equipment (UE)," "wireless terminal," or "mobile device."

In various example embodiments of the present disclosure, a term "BS" may be interchangeable with a term "node B," "evolved node B (eNB)," or "access point (AP),".

In various example embodiments of the present disclosure, a term "serving BS" may be interchangeable with a term "serving cell," and a term "neighbor BS" may be interchangeable with a term "neighbor cell."

Some example embodiments of the present disclosure provide apparatuses and/or methods for mitigating interference in a wireless communication system.

Some example embodiments of the present disclosure provide apparatuses and/or methods for mitigating interference based on reference signal (RS) grouping in a wireless communication system.

Some example embodiments of the present disclosure provide apparatuses and/or methods for mitigating interference based on interference signal (IS) synchronization in a wireless communication system.

Apparatuses and/or methods according to various example embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and/or a mobile internet protocol (Mobile IP) system, a digital video broadcast system such as a mobile broadcast service (e.g., a digital multimedia broadcasting (DMB) service, a digital video broadcasting-handheld (DVP-H), an advanced television systems committee-mobile/handheld (ATSC-M/H) service), an internet protocol television (IPTV), or a moving picture experts group (MPEG) media transport (MMT) system.

For convenience, the example embodiments illustrated in the present disclosure, will assume that a wireless communication system (e.g., a cellular system) is an LTE mobile communication system of a 3GPP.

In a cellular system, a signal received by a terminal may include signals transmitted by neighbor BSs as well as a signal transmitted by a BS which transmits and receives a signal with the terminal (e.g., a serving BS).

In a general wireless communication system, not a cooperative communication system in which a cooperative communication among BSs is supported, signals transmitted by neighbor BSs may act as interference to a terminal, so the signals transmitted by the neighbor BSs may hinder a communication between the terminal and the serving BS.

In a wireless communication system, in a case that strength of an interference signal is stronger than strength of a signal received from a serving BS according to a location or a channel characteristic(s) of a terminal, severe communication performance degradation may occur in the terminal. A detector and a decoder included in a terminal, which includes a plurality of reception (Rx) antennas, may be optimized by assuming that signals other than a signal transmitted by a serving BS are Additive White Gaussian noises (AWGNs). In the meantime, signals received from neighbor BSs may have correlation(s) among antennas, so an interference signal degrades performance of the detector and the decoder. At this time, correlation among antennas may be colored or may not be colored depending on whether the signal is whitened or not.

Meanwhile, an interference whitener may be used for mitigating a correlation characteristic(s) among antennas for an interference signal. Generally, an interference whitener uses a minimum mean square error (MMSE) scheme, the interference whitener using the MMSE scheme measures statistical characteristics among antennas for an interference signal, and reversely compensates for the measured statistical characteristics to provide a received signal including an interference signal such that correlation among antennas is canceled, (e.g., a colored signal is canceled, or a signal is whitened), and a noise, and a channel value. An operation of the interference whitener may be expressed using Equations, and this will be described below.

A signal received in a terminal may be expressed as Equation (1).

$$y=Hx+v \qquad \text{Equation (1)}$$

In Equation (1), y denotes a received signal vector, H denotes a channel matrix between the terminal and a serving BS, and x denotes a transmitted signal vector.

In Equation (1), v may be expressed as Equation (2).

$$v=H_I x_I+n \qquad \text{Equation (2)}$$

In Equation (2), $H_I$ denotes a channel matrix between an interference BS (e.g., a neighbor BS transmitting an interference signal to the terminal) and the terminal, $x_I$ denotes a transmitted signal vector of the interference signal, and n denotes a noise vector. The noise vector n has a circularly symmetric complex Gaussian characteristic.

As described above, the interference whitener detects statistical characteristics among antennas for an interference signal. For example, the interference whitener may detect the statistical characteristics among the antennas for the interference signal based on a scheme of detecting a sample mean of a covariance matrix. The scheme of detecting the sample mean of the covariance matrix may be expressed as Equation (3).

$$R=E\{vv^H\}=H_I H_I^H+\sigma^2 I=LL^H \qquad \text{Equation (3)}$$

In Equation (3), R denotes the covariance matrix, $\sigma^2$ denotes a variance value of the interference signal, and I denotes a unit matrix.

An operation of reversely compensating for a received signal based on the sample mean of the covariance matrix expressed as Equation (3) is an interference whitening operation. The interference whitening operation may be expressed as Equation (4).

$$L^{-1}y=L^{-1}Hx+L^{-1}v \qquad \text{Equation (4)}$$

In Equation (4), $L^{-1}v$ denotes a result of reverse compensation of an interference and a noise from a neighbor cell, and a covariance matrix $L^{-1}v$ of a converted interference and noise signal is calculated as a unit matrix. That is, correlation(s) among Rx antennas are canceled according to an effect of the reverse compensation. Thus, this operation becomes an interference whitening operation. In Equation (4), W ($=L^{-1}$) denotes a whitening filter coefficient. In an example embodiment of the present disclosure, Wy ($=L^{-1}y$) and WH ($=L^{-1}H$) are defined as $y_w$ and $H_w$, respectively.

Calculating a covariance matrix of an interference signal and a noise signal on a unit matrix basis may mean that received power per Rx antenna is standardized. Thus, a signal which a detector and a decoder may detect with relative ease may be provided. Thus, the covariance matrix of the interference signal defined as R in Equation (3) is desired to be estimated.

In a wireless communication system according to an example embodiment of the present disclosure, a scheme of acquiring a covariance matrix of an interference signal for a terminal to perform an interference whitening operation in a multi-Rx antenna environment (e.g., an environment in which a terminal uses a plurality of Rx antennas) may be proposed. For convenience, the wireless communication system is assumed to be an LTE mobile communication system.

In the LTE mobile communication system, a measurement result in a reference signal (RS) is used for detecting a characteristic(s) of an interference signal proposed in the interference whitening scheme. The RS may be classified into a common reference signal (CRS), a multimedia broadcast multicast service single frequency network (MBSFN) reference signal (MRS), a demodulation reference signal (DMRS), a channel status information interference measurement (CSI-IM) signal, and/or the like according to a usage and a type of a channel.

In the LTE mobile communication system, a BS and a terminal transmit a predetermined sequence as an RS at a predetermined location, so the terminal may measure the RS to estimate a channel between an antenna port of the BS and each of Rx antennas included in the terminal, and measure statistical characteristics of an interference signal and a noise signal in each of the Rx antennas included in the terminal.

A CRS according to the number of antenna ports in an LTE mobile communication system according to an example embodiment of the present disclosure will be described with reference to FIGS. 1A to 1C.

A CRS in a case that one antenna port is used in an LTE mobile communication system according to an example embodiment of the present disclosure will be described with reference to FIG. 1A.

FIG. 1A schematically illustrates a CRS in a case that one antenna port is used in an LTE mobile communication system according to an example embodiment of the present disclosure.

Referring to FIG. 1A, a CRS indicates a CRS in a case that a normal cyclic prefix and one antenna port are used in one sub-frame. In FIG. 1A, each lattice indicates a resource element (RE), and $R_0$'s indicate REs through which a CRS is transmitted.

Figure 1B:
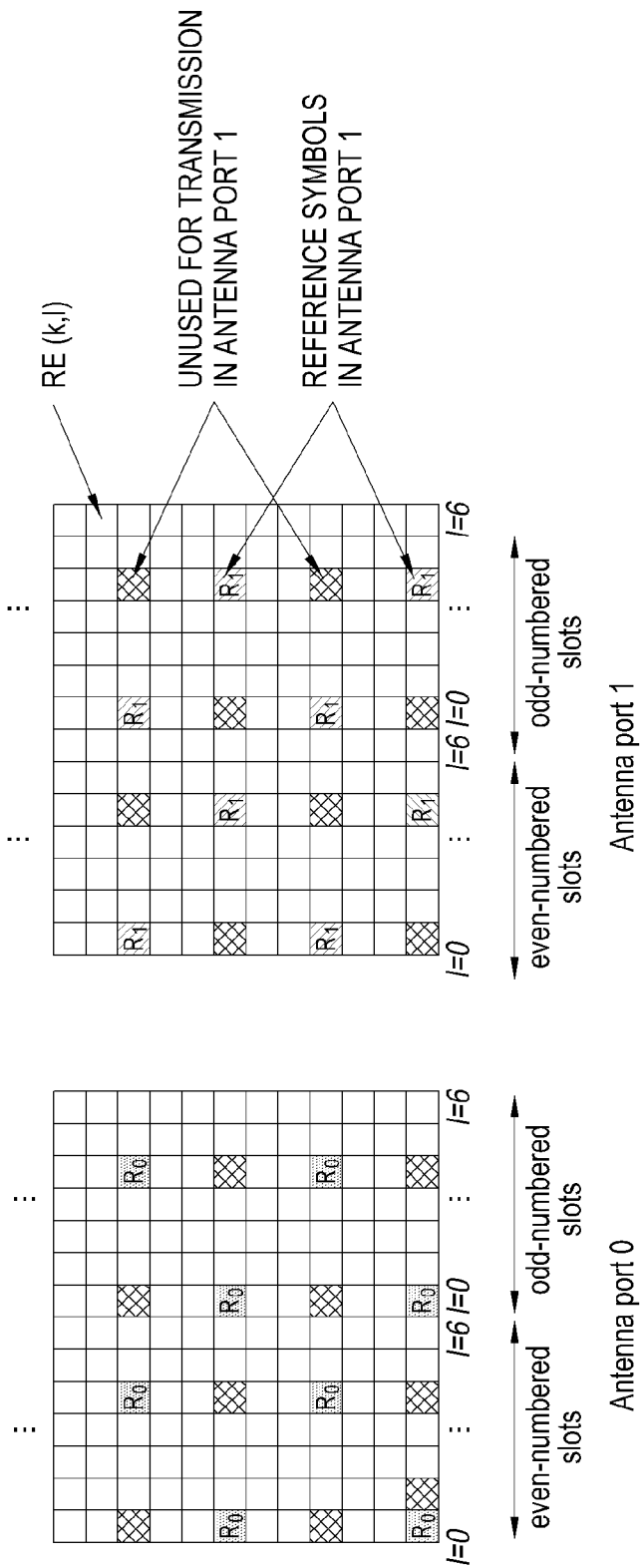
FIG. 1B schematically illustrates a CRS in a case that two antenna ports are used in an LTE mobile communication system according to an example embodiment of the present disclosure.

FIG. 1B schematically illustrates CRSs in a case that two antenna ports are used in an LTE mobile communication system according to an example embodiment of the present disclosure.

Referring to FIG. 1B, CRSs in FIG. 1B indicate CRSs in a case that a normal cyclic prefix and two antenna ports are used in one sub-frame. In FIG. 1B, each lattice indicates an RE, $R_0$'s indicate REs through which a CRS mapped to an antenna port 0 is transmitted. $R_1$'s indicate REs through which a CRS mapped to an antenna port 1 is transmitted. As shown in FIG. 1B, the CRS mapped to the antenna port 1 is not transmitted through the REs through which the CRS mapped to the antenna port 0 is transmitted. The CRS mapped to the antenna port 0 is not transmitted through the REs through which the CRS mapped to the antenna port 1 is transmitted.

Figure 1C:
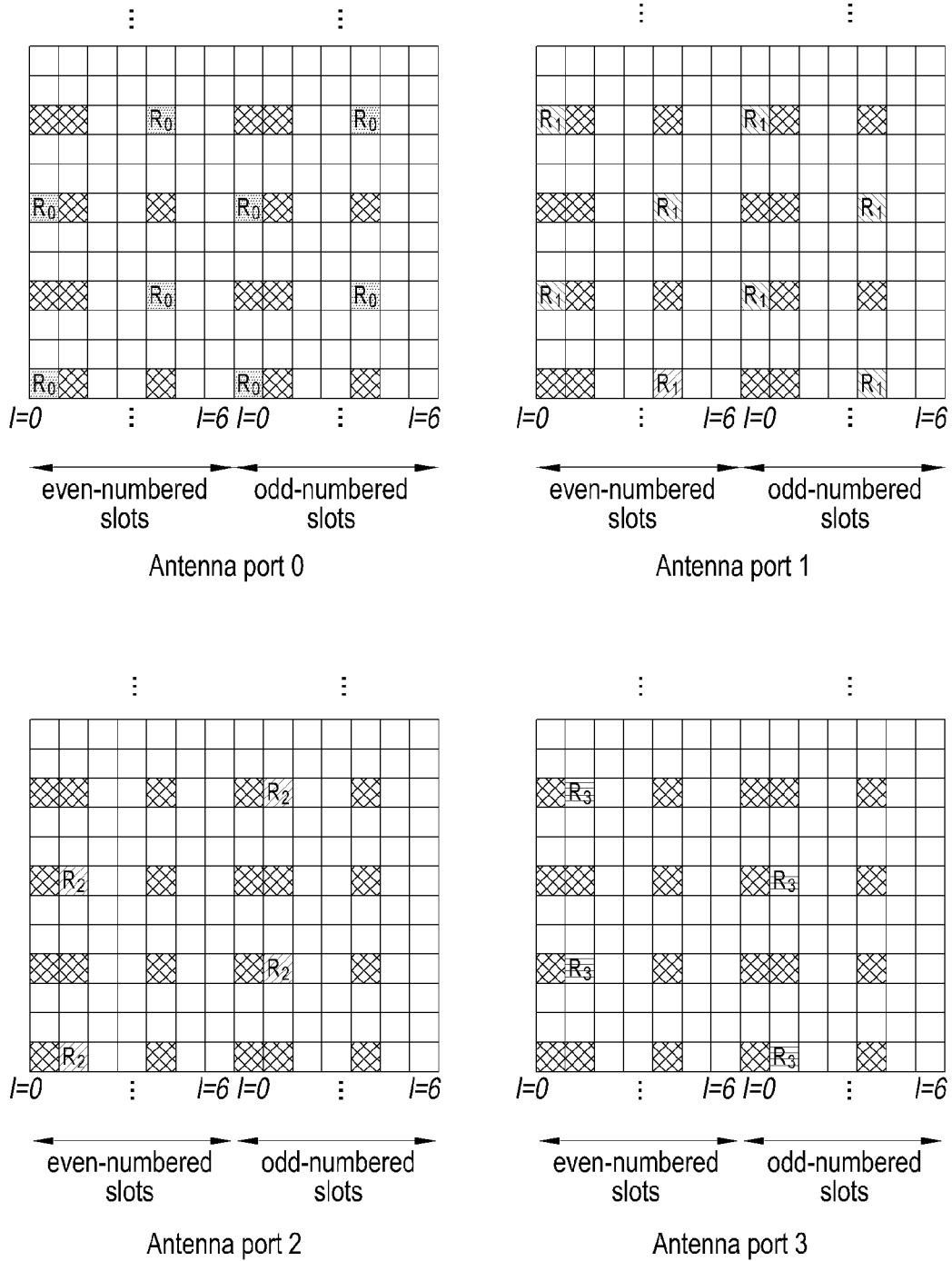
FIG. 1C schematically illustrates a CRS in a case that four antenna ports are used in an LTE mobile communication system according to an example embodiment of the present disclosure.

FIG. 1C schematically illustrates a CRS in a case that four antenna ports are used in an LTE mobile communication system according to an example embodiment of the present disclosure.

Referring to FIG. 1C, CRSs in FIG. 1C indicate CRSs in a case that a normal cyclic prefix and four antenna ports are used in one sub-frame. In FIG. 1C, each lattice indicates an RE, $R_0$'s indicate REs through which a CRS mapped to an antenna port 0 is transmitted, $R_1$'s indicate REs through which a CRS mapped to an antenna port 1 is transmitted, $R_2$'s indicate REs through which a CRS mapped to an antenna port 2 is transmitted, and $R_3$ indicates REs through which a CRS mapped to an antenna port 3 is transmitted. As shown in FIG. 1C, the CRSs mapped to the antenna port 1 to the antenna port 3 are not transmitted through the REs through which the CRS mapped to the antenna port 0 is transmitted. The CRSs mapped to the antenna port 0, the antenna port 2, and the antenna port 3 are not transmitted through the REs through which the CRS mapped to the antenna port 1 is transmitted. The CRSs mapped to the antenna port 0, the antenna port 1, and the antenna port 3 are not transmitted through the REs through which the CRS mapped to the antenna port 2 is transmitted. The CRSs mapped to the antenna port 0 to the antenna port 2 are not transmitted through the REs through which the CRS mapped to the antenna port 3 is transmitted.

CRSs according to the number of antenna ports in an LTE mobile communication system according to some example embodiments of the present disclosure have been described with reference to FIGS. 1A to 1C. An interference environment in a case that frame synchronization of an interference BS is identical to frame synchronization of a serving BS will be described with reference to FIG. 2.

Figure 2:
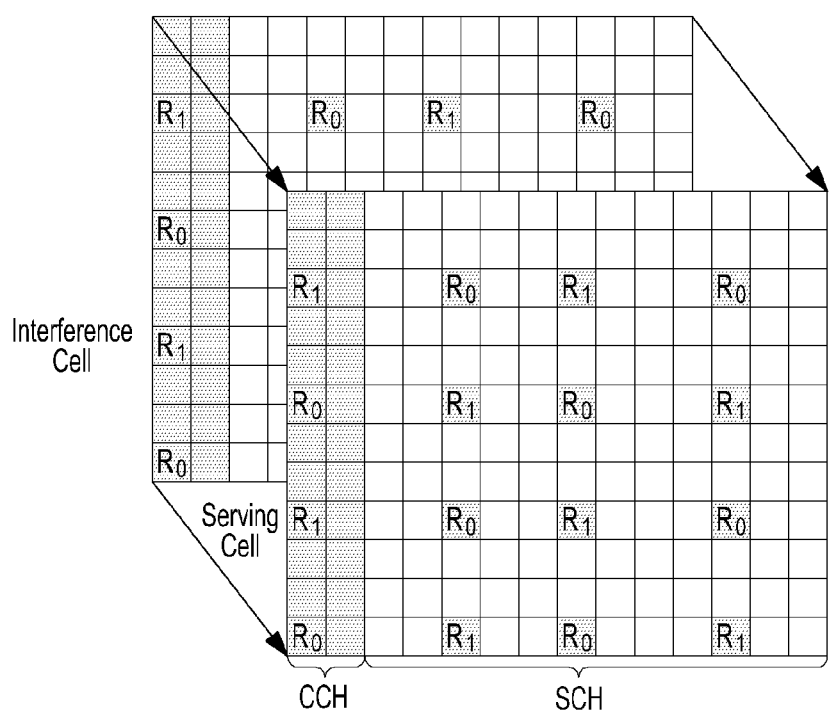
FIG. 2 schematically illustrates an interference environment in a case that frame synchronization of an interference BS is identical to frame synchronization of a serving BS.

FIG. 2 schematically illustrates an interference environment in a case that frame synchronization of an interference BS is identical to frame synchronization of a serving BS.

Referring to FIG. 2, if sub-frame timing of a signal received from a neighbor BS is identical to sub-frame timing of a signal received from a serving BS, CRS samples included in a control channel (CCH) region may be used for estimating an interference signal for the CCH region, and CRS samples included in a synchronization channel (SCH) region may be used for estimating an interference signal for the SCH region. Here, CRS samples denotes samples included in a CRS, and are transmitted within a desired (or alternatively, preset) CRS region (e.g., a CRS region occupied by the desired (or alternatively, preset) number of symbols and the desired (or alternatively, preset) number of Res). It will be assumed that the number of the CRS samples is N.

For example, if a signal which a terminal receiving a CRS through two antenna ports receives at a location at which the nth CRS sample is transmitted is $y_n$, and the signal $y_n$ received at the location at which the nth CRS sample is transmitted may be expressed as Equation (5).

$$y_n = H_{k,f} x_{k,f} + v_{k,f} \qquad \text{Equation (5)}$$

In Equation (5), k denotes a symbol index of a location at which the nth CRS sample is transmitted, and f denotes a sub-carrier index of the location at which the nth CRS sample is transmitted.

Further, the terminal may acquire the number of antenna ports to be used in the terminal by performing a blind detection operation when receiving a physical broadcast channel (PBCH) signal from a BS during an initial access process, and may acquire a location of the antenna ports to be used in the terminal based on a cell identifier (ID). The terminal may acquire the cell ID when performing an operation of detecting a primary synchronization signal (PSS) and a secondary synchronization signal (SSS) during the initial access process.

In the LTE mobile communication system, if a normal sub-frame is used, a CRS corresponding to an antenna port 0 and an antenna port 1 may be transmitted through symbols 0, 4, 7, and 11 in a time domain. In symbols 0 and 7, locations of a frequency region through which a CRS corresponding to the antenna port 0 is transmitted may be RE {Cell ID % 6} and RE {Cell ID % 6}+6, and locations of a frequency region through which a CRS corresponding to the antenna port 1 is transmitted may be RE {Cell ID % 6}+3 and RE {Cell ID % 6}+9. In symbols 4 and 11, locations of a frequency region through which a CRS corresponding to the antenna port 0 is transmitted may be RE {Cell ID % 6}+3 and RE {Cell ID % 6}+9, and locations of a frequency region through which a CRS corresponding to the antenna port 1 is transmitted may be RE {Cell ID % 6} and RE {Cell ID %6}+6.

Meanwhile, an interference characteristic of a neighbor cell may be acquired based on a CRS. For example, the interference characteristic of the neighbor cell may be acquired based on a sampled covariance matrix (SCM), and the SCM may be expressed as Equation (6).

$$R = \frac{1}{N} \sum_{n=0}^{N-1} v_n v_n^H \quad \text{Equation (6)}$$

In Equation (6), $v_n$ may be acquired as Equation (7) in the nth CRS sample.

$$v_n = y_{k,f} - H_{k,f} x_{k,f} \quad \text{Equation (7)}$$

In Equation (7), $y_{k,f}$ denotes a signal received in an RE occupied by a symbol k and a sub-carrier f, and may be acquired from a fast Fourier transform (FFT) output.

In Equation (7), $H_{k,f}$ denotes a channel matrix in an RE occupied by a symbol k and a sub-carrier f, and may be acquired based on a channel estimation result.

Equation (7), $x_{k,f}$ denotes a scrambling sequence, such as a CRS sample in an RE occupied by a symbol k and a sub-carrier f. Here, a CRS to be used in the terminal is previously known to the terminal through a communication with a BS.

Figure 3:
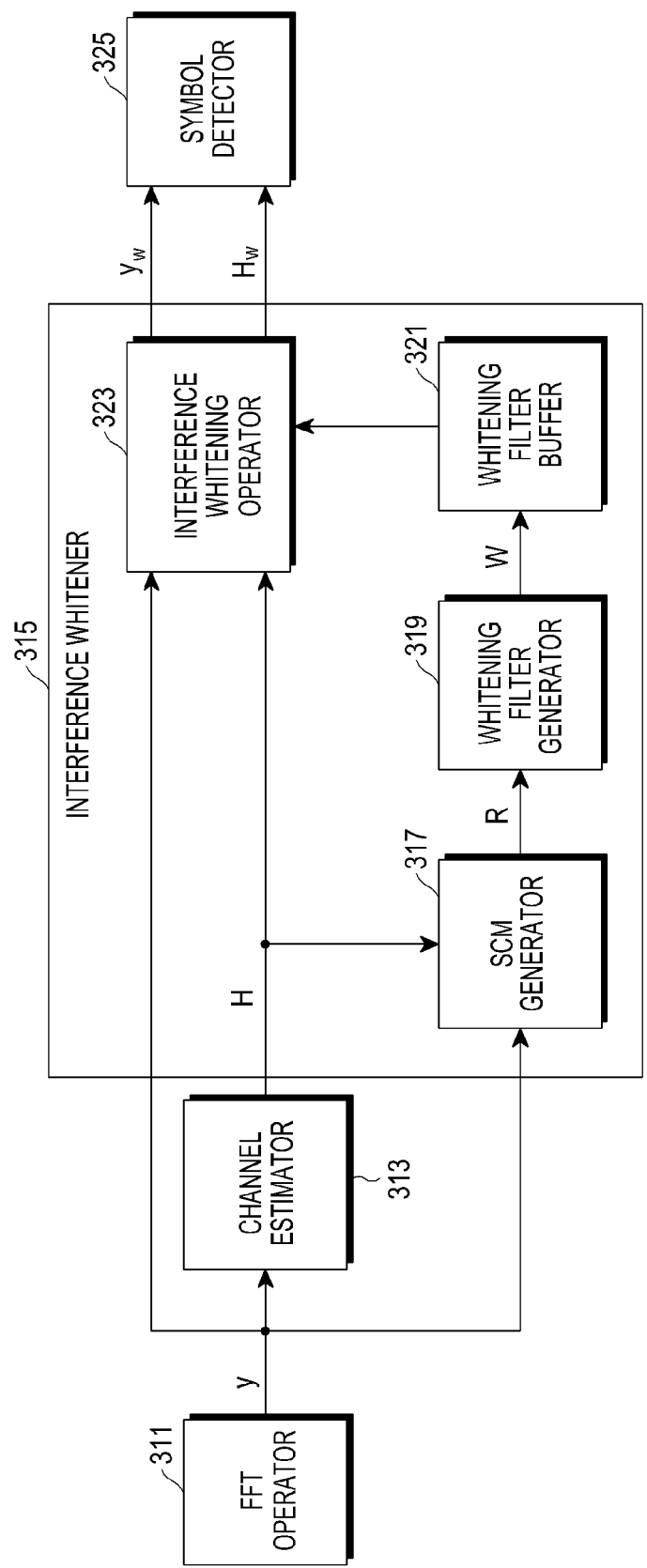
FIG. 3 schematically illustrates an example of an inner structure of a receiving apparatus in an LTE mobile communication system according to an example embodiment of the present disclosure.

FIG. 3 schematically illustrates an example of an inner structure of a receiving apparatus in an LTE mobile communication system according to an example embodiment of the present disclosure.

Referring to FIG. 3, the receiving apparatus may include an FFT operator 311, a channel estimator 313, an interference whitener 315, and a symbol detector 325. The interference whitener 315 may include an SCM generator 317, a whitening filter generator 319, a whitening filter buffer 321, and an interference whitening operator 323.

The FFT operator 311 may generate a time-domain signal by performing an FFT operation on a received signal, and output the generated time-domain signal y to the channel estimator 313. The channel estimator 313 may estimate a channel matrix H based on the signal y output from the FFT operator 311, and output the estimated channel matrix H to the interference whitener 315.

As described in Equations (6) and (7), the SCM generator 317 may generate an SCM R based on the signal y output from the FFT operator 311 and the channel matrix H output from the channel estimator 313, and output the generated SCM R to the whitening filter generator 319. The whitening filter generator 319 may generate a whitening filter coefficient W based on the SCM R output from the SCM generator 317, and output the generated whitening filter coefficient W to the whitening filter buffer 321. The whitening filter buffer 321 may buffer the whitening filter coefficient W, and output the whitening filter coefficient W to the interference whitening operator 323. The interference whitening operator 323 may perform an interference whitening operation based on the signal y output from the FFT operator 311, the channel matrix H output from the channel estimator 313, and the whitening filter coefficient W to detect $y_w$ and $H_w$, and output the detected $y_w$ and $H_w$ to the symbol detector 325. The symbol detector 325 may perform a symbol detecting operation based on the $y_w$ and $H_w$.

Although the receiving apparatus illustrated in FIG. 3 describes the FFT operator 311, the channel estimator 313, the interference whitener 315, and the symbol detector 325 as separate units, according to some example embodiments, two or more of the FFT operator 311, the channel estimator 313, the interference whitener 315, and the symbol detector 325 may be incorporated into a single unit.

The receiving apparatus may be implemented with one chipset or one processor.

Figure 4A:
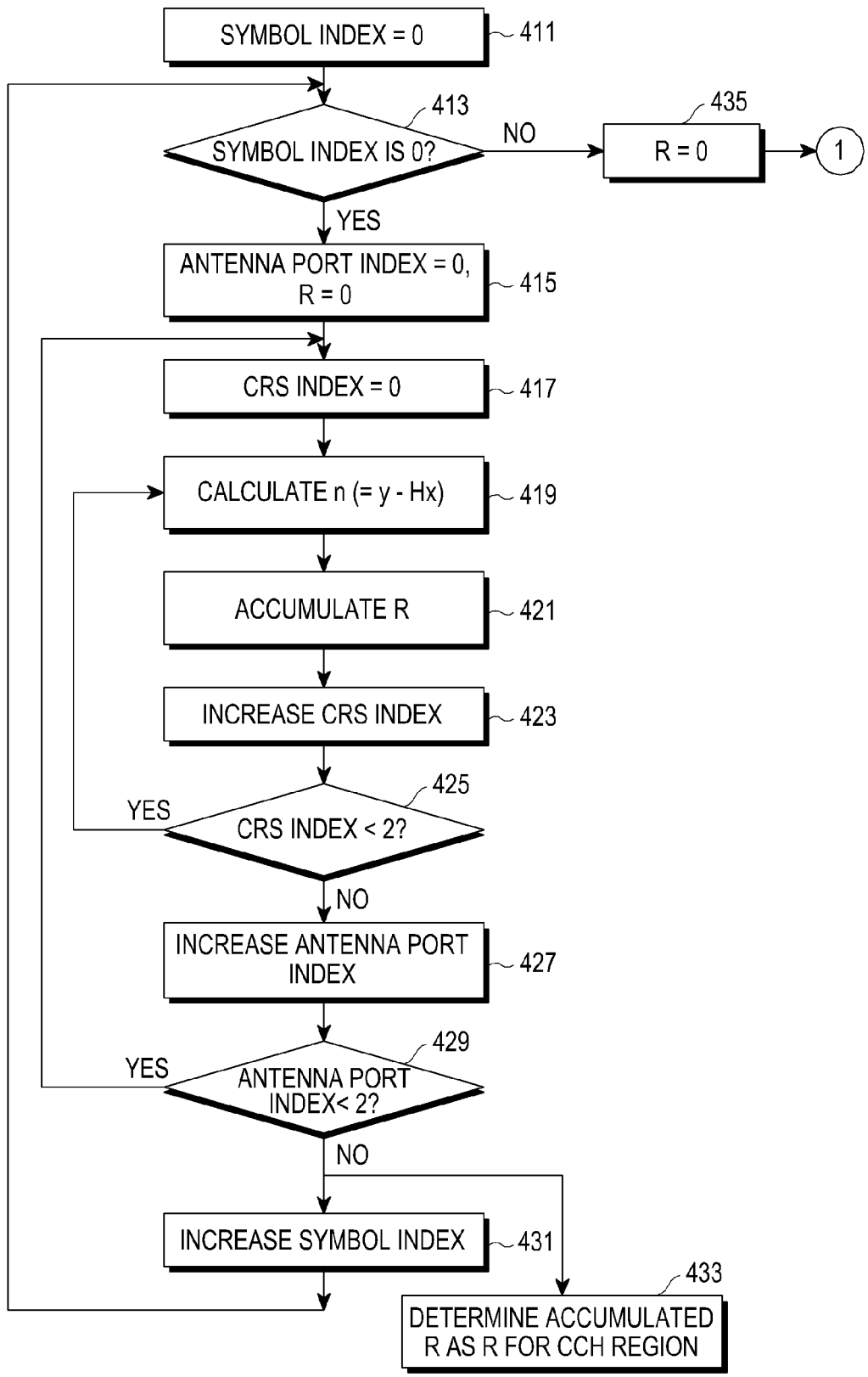
FIGS. 4A and 4B schematically illustrate an example of an interference whitening process in an LTE mobile communication system according to an example embodiment of the present disclosure.
Figure 4B:
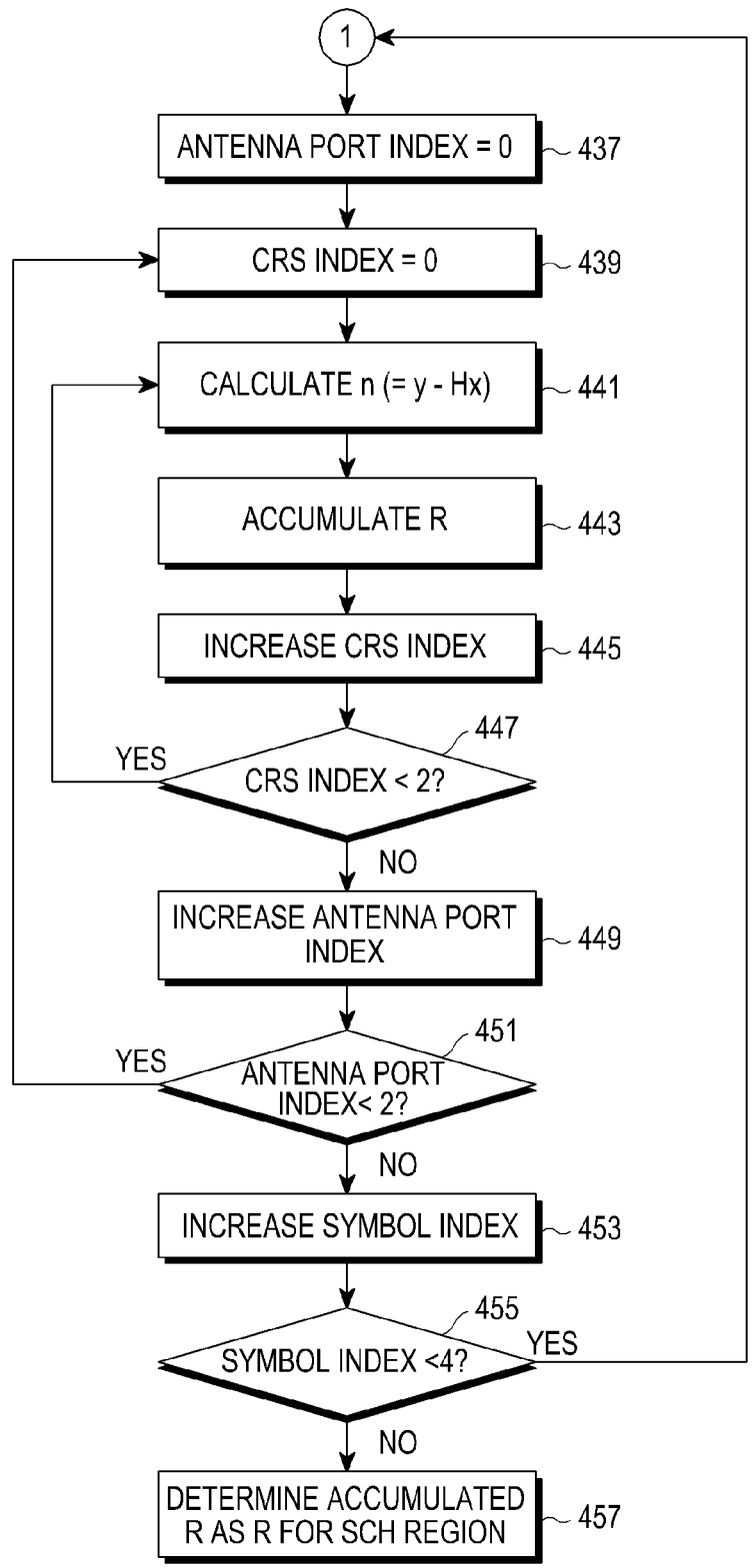

FIGS. 4A and 4B schematically illustrate an example of an interference whitening process in an LTE mobile communication system according to an example embodiment of the present disclosure.

Referring to FIGS. 4A and 4B, a receiving apparatus may set a value of a symbol index to zero at operation 411. The receiving apparatus may determine whether a symbol index is zero at operation 413 to determine whether a resource region is a CCH region.

If the symbol index is zero, the receiving apparatus may set an antenna port index to zero, and set an SCM R to zero at operation 415. The receiving apparatus may set a CRS index to zero at operation 417. The receiving apparatus may calculate n (=y−Hx) at operation 419. The receiving apparatus may accumulate the SCM R at operation 421. The receiving apparatus may increase the CRS index by a desired (or alternatively, preset) value (e.g., 1) at operation 423. The receiving apparatus may determine whether the CRS index is less than 2 at operation 425 because it is assumed that two CRS samples are transmitted per symbol in the LTE mobile communication system. If the CRS index is less than 2, the receiving apparatus may return to operation 419.

If the CRS index is not less than 2, the receiving apparatus may increase the antenna port index by a desired (or alternatively, preset) value (e.g., 1) at operation 427. The receiving apparatus may determine whether the antenna port index is less than 2 at operation 429 because it is assumed that two antenna ports are used in the LTE mobile communication system. If the antenna port index is less than 2, the receiving apparatus may return to operation 417.

If the antenna port index is not less than 2, the receiving apparatus may increase the symbol index by a desired (or alternatively, preset) value (e.g., 1) at operation 431 and returns to operation 413. Further, if the antenna port index is not less than 2, the receiving apparatus may determine the accumulated SCM R as an SCM R for the CCH region at operation 433.

If the symbol index is not zero (e.g., if a resource region is an SCH region), the receiving apparatus may proceed to operation 435. The receiving apparatus may set an SCM R to zero at operation 435. The receiving apparatus may set an antenna port index to zero at operation 437. The receiving apparatus may sets a CRS index to zero at operation 439.

The receiving apparatus may calculate n (=y−Hx) at operation 441. The receiving apparatus may accumulate an SCM R at operation 443. The receiving apparatus may increase the CRS index by a desired (or alternatively, preset) value (e.g., 1) at operation 445. The receiving apparatus may determine whether the CRS index is less than 2 at operation 447. If the CRS index is less than 2, the receiving apparatus may return to operation 441.

If the CRS index is not less than 2, the receiving apparatus may increase the antenna port index by a desired (or alternatively, preset) value (e.g., 1) at operation 449. The receiving apparatus may determine whether the antenna port index is less than 2 at operation 451. If the antenna port index is less than 2, the receiving apparatus may return to operation 439.

If the antenna port index is not less than 2, the receiving apparatus may increase the symbol index by a desired (or alternatively, preset) value (e.g., 1) at operation 453. The receiving apparatus may determine whether the symbol index is less than 4 at operation 455. If the symbol index is less than 4, the receiving apparatus may return to operation 437.

If the symbol index is not less than 4, the receiving apparatus may determine the accumulated SCM R as an SCM R for the SCH region at operation 457.

In an interference whitening process in FIGS. 4A and 4B, it is assumed that there are two CRSs corresponding to one antenna port per symbol, and a sub-frame is a normal cyclic prefix (NCP) sub-frame of a frequency division duplexing (FDD).

The interference whitening process illustrated in FIGS. 4A and 4B may be applied to an extended cyclic prefix (ECP) sub-frame of an FDD, and a sub-frame of a time division duplexing (TDD), as well as the NCP sub-frame. The number of CRS symbols and locations of the CRS symbols may be changed in a case that the interference whitening process is applied to the ECP sub-frame of the FDD and the sub-frame of the TDD.

Although FIGS. 4A and 4B illustrate an example of an interference whitening process in an LTE mobile communication system according to an example embodiment of the present disclosure, various changes could be made to FIGS. 4A and 4B. For example, although shown as a series of operations, various operations in FIGS. 4A and 4B could overlap, occur in parallel, occur in a different order, or occur multiple times.

Figure 5:
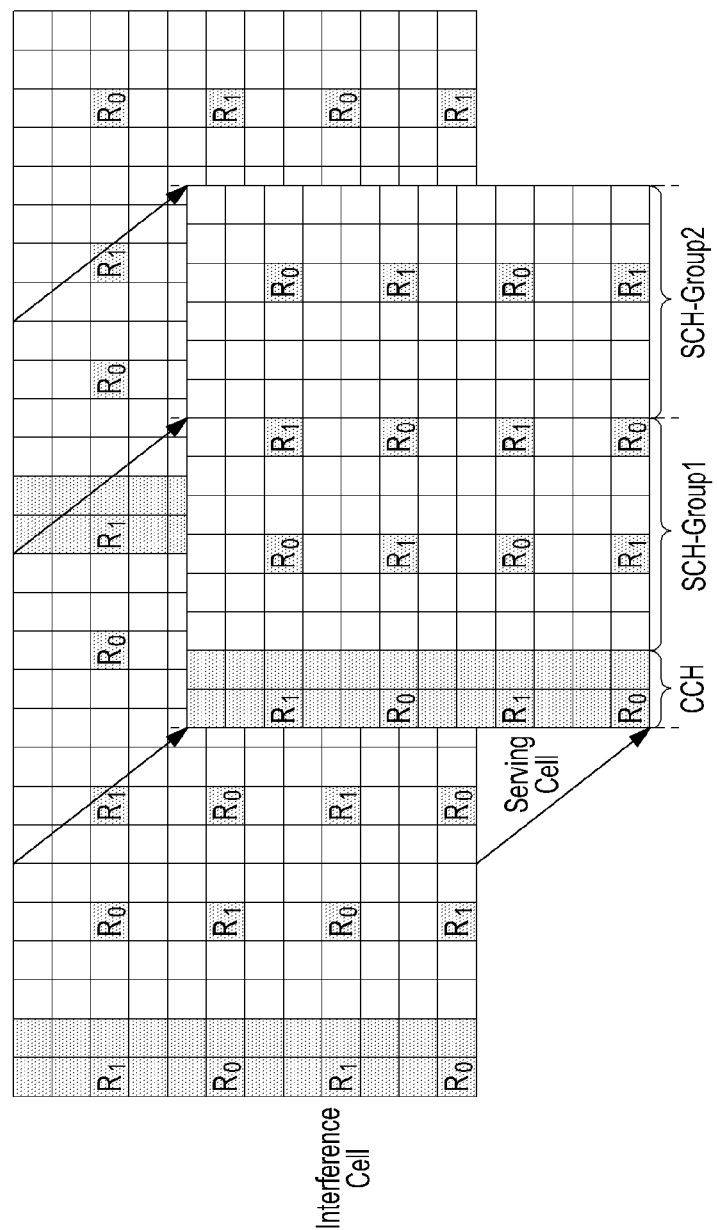
FIG. 5 schematically illustrates an example of a CRS grouping process for an interference whitening process in a sub-frame asynchronization situation in an LTE mobile communication system according to an example embodiment of the present disclosure.

FIG. 5 schematically illustrates an example of a CRS grouping process for an interference whitening process in a sub-frame asynchronization situation in an LTE mobile communication system according to an example embodiment of the present disclosure.

Referring to FIG. 5, if difference between sub-frame timing of an interference signal and sub-frame timing of a signal transmitted from a serving BS is equal to or greater than several symbols, there are different types of interferences within one sub-frame, so it is difficult to exactly estimate an interference signal.

In a case where inter-cell sub-frame asynchronization has started in the LTE mobile communication system, an interference model is being considered. Thus, there is a need for an interference mitigating scheme in the case of inter-cell sub-frame asynchronization. Further, a near band interference signal which exists in a near frequency region or an interference signal which is applied to some symbols according to jamming signals may occur. For convenience, a situation that interference is applied to some symbols will be referred to as partial interference situation.

Some example embodiments of the present disclosure provide an RS grouping scheme for adaptively whitening interference in a sub-frame asynchronization situation (e.g., inter-cell sub-frame asynchronization situation, a partial interference situation), as described below.

Firstly, RS grouping scheme according to some example embodiment of the present disclosure may divide symbols into a plurality of groups (e.g., two groups) based on a point at which sub-frame timings are different, and acquire information required for interference whitening based on RSs corresponding to each group.

As shown in FIG. 5, a receiving apparatus may perform an interference whitening process on a serving BS (e.g., a serving cell) based on three CRS groups including a CRS group corresponding to a CCH region, a CRS group corresponding to an SCH region which corresponds to a preceding ½ of SCH regions, and a CRS group corresponding to an SCH region which corresponds to the remaining ½ of the SCH regions.

FIGS. 6A to 6G schematically illustrate other examples of a CRS grouping process for an interference whitening process in a sub-frame asynchronization situation in an LTE mobile communication system according to an example embodiment of the present disclosure.

FIGS. 6A to 6G provides examples of a CRS grouping process in a case that the number of antenna ports is 2. As shown in FIGS. 6A to 6G, if the number of antenna ports is 2, the number of CRS samples included in one CRS group may be four, eight, or twelve according to a CRS grouping process.

As shown in FIGS. 6A to 6G, there is no limitation on a symbol which is a basis for generating CRS groups in a CRS grouping process, and the number of CRS groups may be equal to or greater than 2.

Figure 6A:
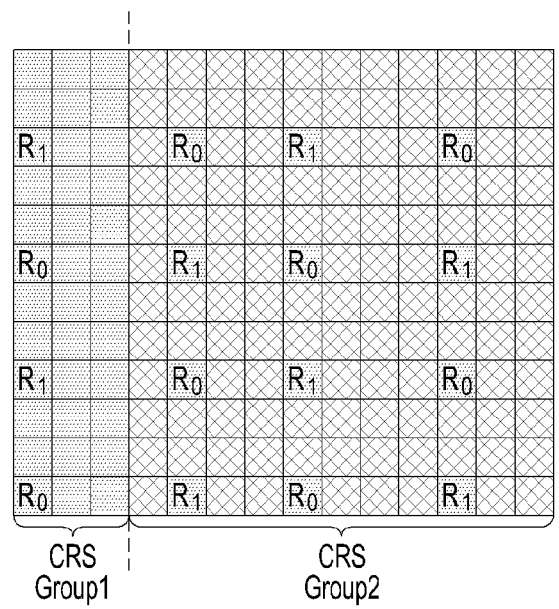
FIGS. 6A to 6G schematically illustrate other examples of a CRS grouping process for an interference whitening process in a sub-frame asynchronization situation in an LTE mobile communication system according to an example embodiment of the present disclosure.
Figure 6B:
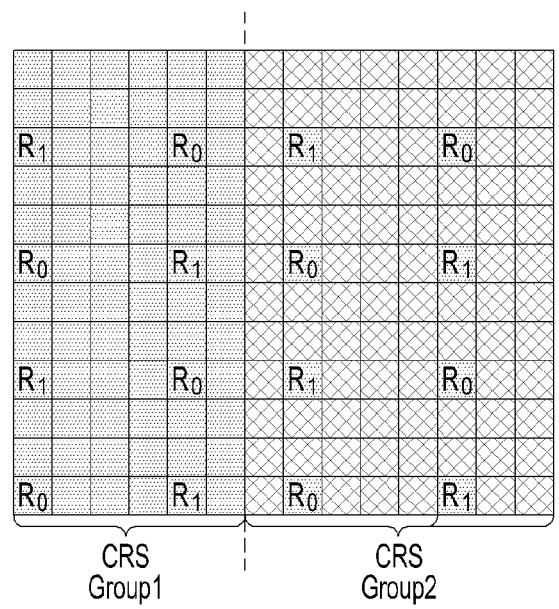
Figure 6C:
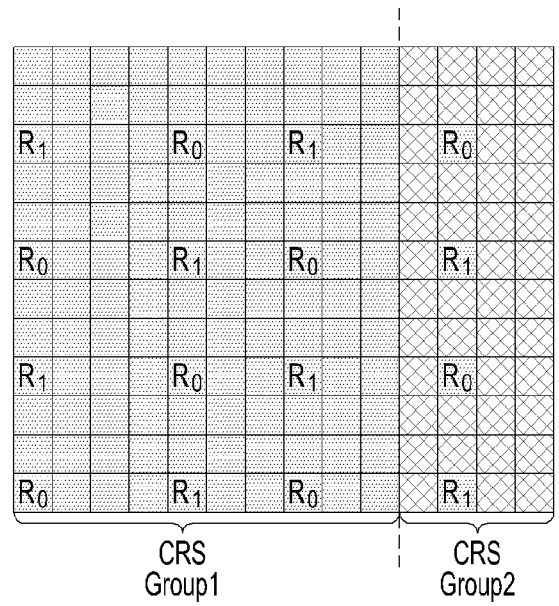
Figure 6D:
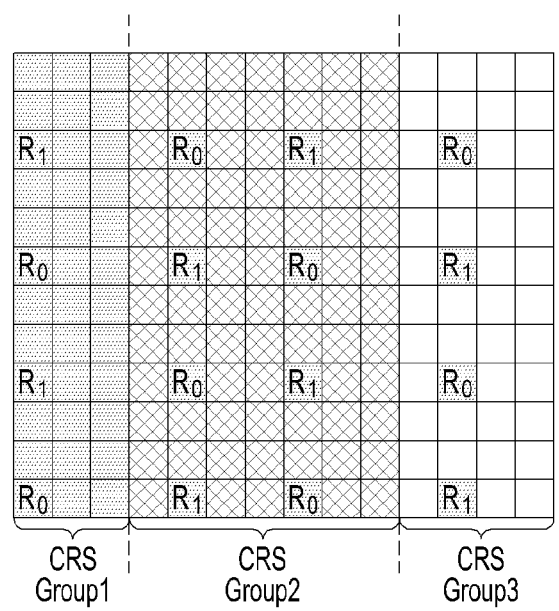
Figure 6E:
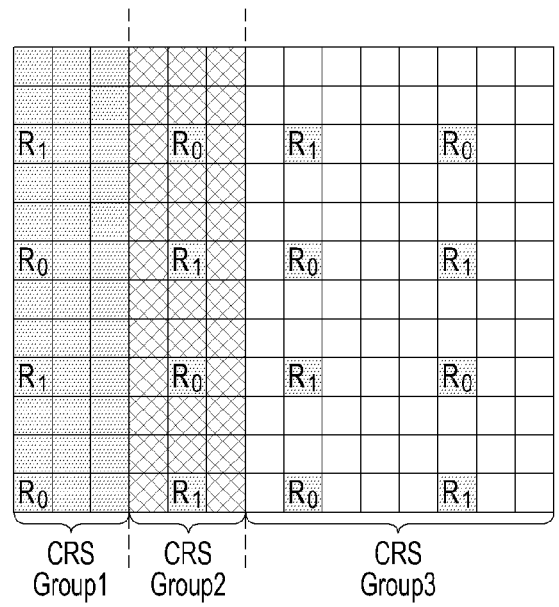
Figure 6F:
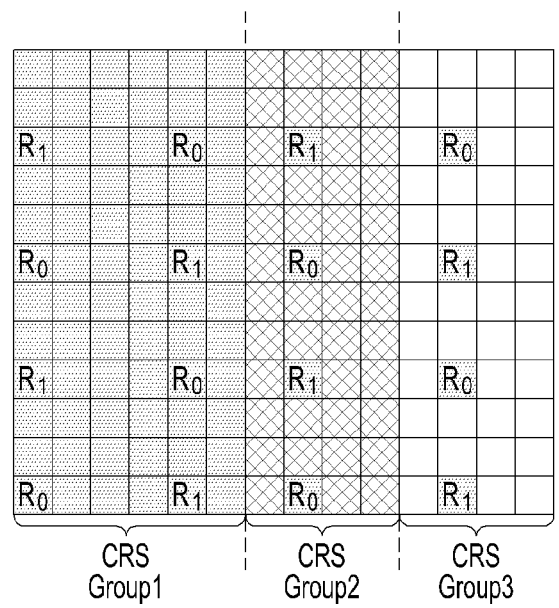
Figure 6G:
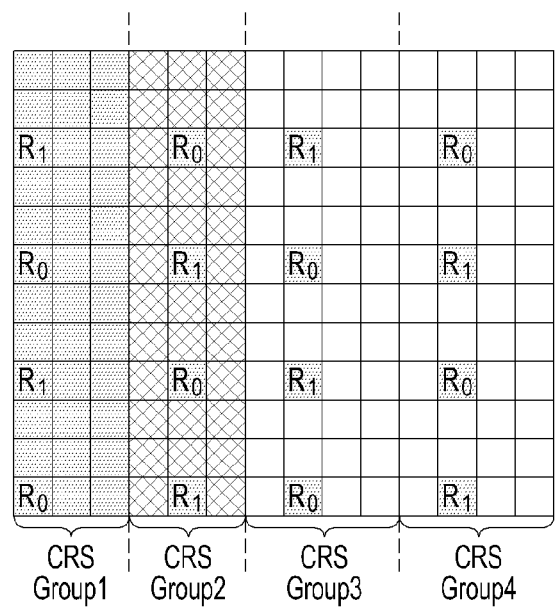

It will be understood that two CRS groups are generated in FIGS. 6A to 6C, three CRS groups are generated in FIGS. 6D to 6F, and four CRS groups are generated in FIG. 6G.

In FIG. 6A, CRS group 1 includes four CRS samples, and CRS group 2 includes twelve CRS samples.

In FIG. 6B, CRS group 1 includes eight CRS samples, and CRS group 2 includes eight CRS samples.

In FIG. 6C, CRS group 1 includes twelve CRS samples, and CRS group 2 includes four CRS samples.

In FIG. 6D, CRS group 1 includes four CRS samples, CRS group 2 includes eight CRS samples, and CRS group 3 includes four CRS samples.

In FIG. 6E, CRS group 1 includes four CRS samples, CRS group 2 includes four CRS samples, and CRS group 3 includes eight CRS samples.

In FIG. 6F, CRS group 1 includes eight CRS samples, CRS group 2 includes four CRS samples, and CRS group 3 includes four CRS samples.

In FIG. 6G, each of CRS group 1 to CRS group 4 includes four CRS samples.

Figure 7:
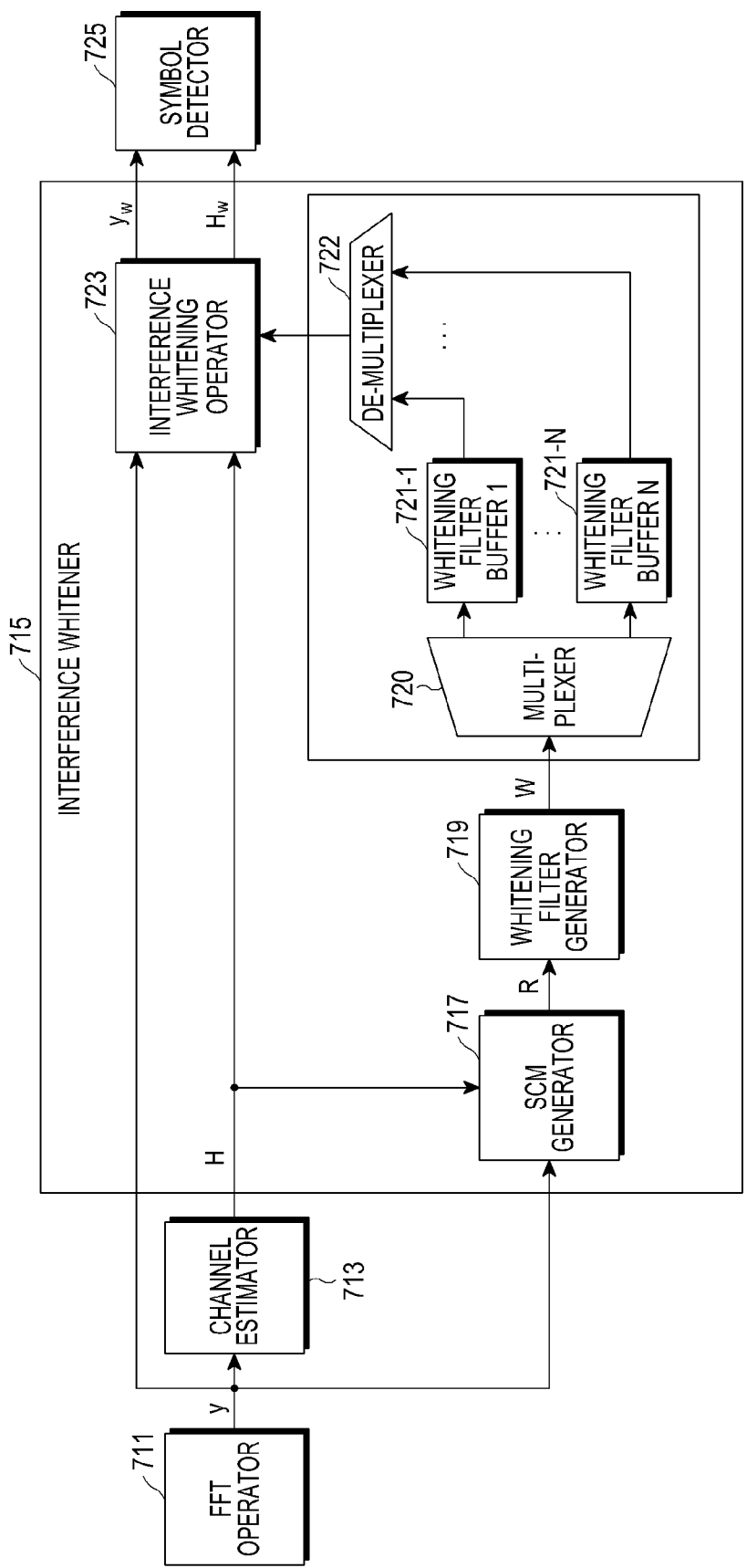
FIG. 7 schematically illustrates another example of an inner structure of a receiving apparatus in an LTE mobile communication system according to an example embodiment of the present disclosure.

FIG. 7 schematically illustrates another example of an inner structure of a receiving apparatus in an LTE mobile communication system according to an example embodiment of the present disclosure.

Referring to FIG. 7, the receiving apparatus may include an FFT operator 711, a channel estimator 713, an interference whitener 715, and a symbol detector 725. The interference whitener 715 may include an SCM generator 717, a whitening filter generator 719, a multiplexer 720, a plurality of whitening filter buffers (e.g., N whitening filter buffers, 721-1 to 721-N), a de-multiplexer 722, and an interference whitening operator 723.

In this example embodiment of the present disclosure, it is assumed that a CRS are generated as N CRS groups for an interference whitening process. Thus, the number of the whitening filter buffers may be identical to the number of the CRS groups are included in the interference whitener 715. That is, an SCM and a whitening filter coefficient may be differently set for each of the N CRS groups such that the number of the whitening filter buffers included in the interference whitener 715 is identical to the number of the CRS groups.

This example embodiment of the present disclosure describes a case that the number of the whitening filter buffers included in the interference whitener 715 is identical to the number of the CRS groups. However, one whitening filter buffer may buffer whitening filter coefficients corresponding to the N CRS groups.

The FFT operator 711 may generate a time-domain signal by performing an FFT operation on a received signal, and output the generated time-domain signal y to the channel estimator 713. The channel estimator 713 may estimate a channel matrix H based on the signal y output from the FFT operator 711, and output the estimated channel matrix H to the interference whitener 715.

As described in Equations (6) and (7), the SCM generator 717 may generate SCMs (Rs) based on the signal y output from the FFT operator 711 and the channel matrix H output from the channel estimator 713, and output the generated SCMs to the whitening filter generator 719. The SCMs may be generated for the N CRS groups. In an example embodiment of the present disclosure, an SCM may be generated per CRS group.

The whitening filter generator 719 may generate whitening filter coefficients (Ws) based on the SCMs output from the SCM generator 717, and output the generated whitening filter coefficients W to the multiplexer 720. The multiplexer 720 may multiplex the signal, (e.g., the whitening filter coefficients output from the whitening filter generator 719) to output the multiplexed signal to the whitening filter buffers 721-1 to 721-N. Here, the whitening filter coefficients may be generated for the N CRS groups. In an example embodiment of the present disclosure, a whitening filter coefficient W may be generated per CRS group.

Each of the whitening filter buffers 721-1 to 721-N may buffer the whitening filter coefficient W and transmit the whitening filter coefficient W to the de-multiplexer 722. The de-multiplexer 722 may de-multiplex the whitening filter coefficients output from the whitening filter buffers 721-1 to 721-N to output the de-multiplexed signal to the interference whitening operator 723. The interference whitening operator 723 may perform an interference whitening operation based on the signal y output from the FFT operator 711, the channel matrix H output from the channel estimator 713, and the whitening filter coefficients to detect $y_w$s and $H_w$s, and output the detected $y_w$s and $H_w$s to the symbol detector 725. The symbol detector 725 may perform a symbol detecting operation based on the $y_w$s and $H_w$s.

Although FIG. 7 illustrates that the FFU operator 711, the channel estimator 713, the interference whitener 715, and the symbol detector 725 are described in the receiving apparatus as separate units, two or more of the FFU operator 711, the channel estimator 713, the interference whitener 715, and the symbol detector 725 may be incorporated into a single unit.

The receiving apparatus may be implemented with one chipset or one processor.

Figure 8A:
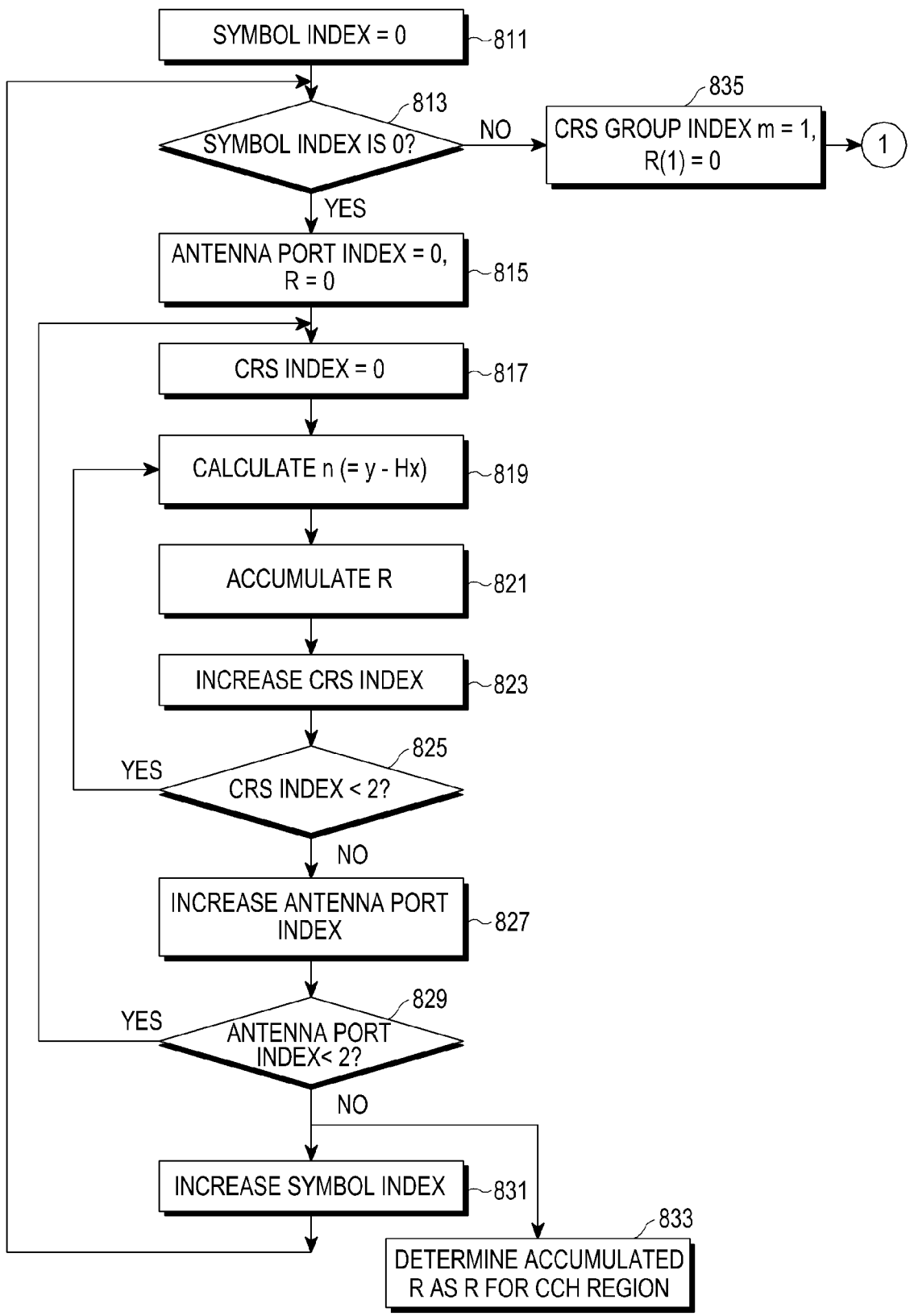
FIGS. 8A and 8B schematically illustrate another example of an interference whitening process in an LTE mobile communication system according to an example embodiment of the present disclosure.
Figure 8B:
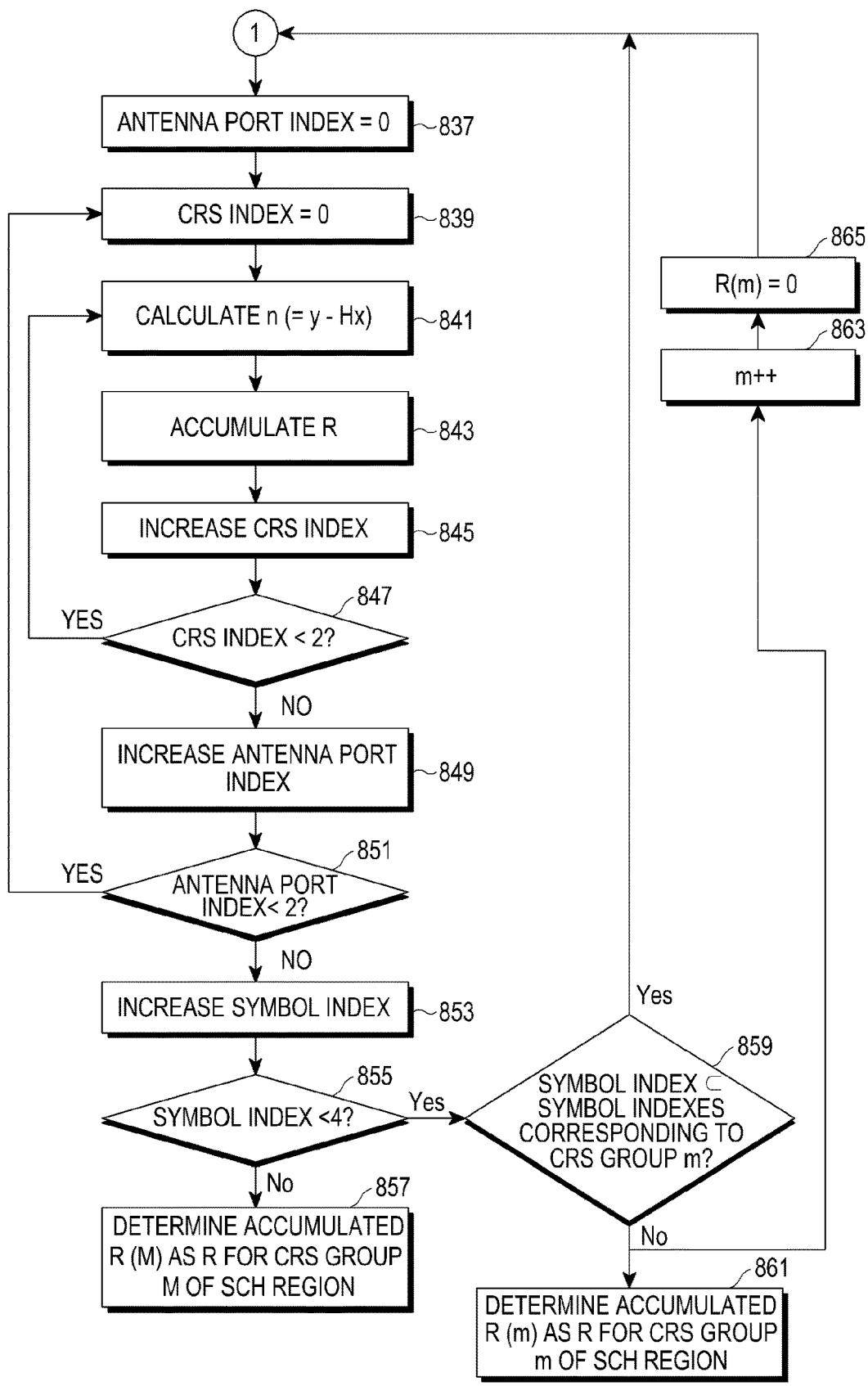

FIGS. 8A and 8B schematically illustrate another example of an interference whitening process in an LTE mobile communication system according to an example embodiment of the present disclosure.

Referring to FIGS. 8A and 8B, a receiving apparatus may set a value of a symbol index to zero at operation 811. The receiving apparatus may determine whether a symbol index is zero at operation 813. If the symbol index is zero, the receiving apparatus may proceed to operation 815. Operations 815 to 833 may be identical to the operations 415 to 433 as described in FIGS. 4A and 4B, so a detailed description thereof will be omitted herein.

If the symbol index is not zero, that is, if a resource region is an SCH region, the receiving apparatus may proceed to operation 835. The receiving apparatus may set a CRS group index m to 1 (m=1), and sets R(1) as an SCM R for CRS group 1 to zero at operation 835. The receiving apparatus may set an antenna port index to zero at operation 837. The receiving apparatus may set a CRS index to zero at operation 839. The receiving apparatus may calculate n (=y−Hx) at operation 841. The receiving apparatus may accumulate an SCM R(k) at operation 843. The receiving apparatus may increase the CRS index by a desired (or alternatively, preset) value (e.g., 1) at operation 845. The receiving apparatus may determine whether the CRS index is less than 2 at operation 847 when it is assumed that two CRS samples are transmitted per symbol in the LTE mobile communication system. If the CRS index is less than 2, the receiving apparatus may return to operation 841.

If the CRS index is not less than 2, the receiving apparatus may increase the antenna port index by a desired (or alternatively, preset) value (e.g., 1) at operation 849. The receiving apparatus may determine whether the antenna port index is less than 2 at operation 851 when it is assumed that two antenna ports are used in the LTE mobile communication system. If the antenna port index is less than 2, the receiving apparatus may return to operation 839.

If the antenna port index is not less than 2, the receiving apparatus may increase the symbol index by a desired (or alternatively, preset) value (e.g., 1) at operation 853. The receiving apparatus may determine whether the symbol index is less than 4 at operation 855. If the symbol index is not less than 4, the receiving apparatus may determine the accumulated SCM R(M) as an SCM R(M) for CRS group M of the SCH region at operation 857.

If the symbol index is less than 4, the receiving apparatus may determine whether the symbol index is included in symbol indexes corresponding to the CRS group m at operation 859. If the symbol index is included in the symbol indexes corresponding to the CRS group m, the receiving apparatus may return to operation 837.

If the symbol index is not included in the symbol indexes corresponding to the CRS group m, the receiving apparatus may determine the accumulated SCM R(m) as an SCM R(m) for the CRS group m of the SCH region at operation 861.

If the symbol index is not included in the symbol indexes corresponding to the CRS group m, the receiving apparatus may increase a value of the CRS group index m by a desired (or alternatively, preset) value (e.g., 1) at operation 863. The receiving apparatus may set an SCM R for a CRS group m R(m) to zero at operation 865, and returns to operation 837.

In an interference whitening process in FIGS. 8 and 8B, it is assumed that there are two CRSs corresponding to one antenna port per symbol, and a sub-frame is an NCP sub-frame of an FDD.

The interference whitening process illustrated in FIGS. 8A and 8B may be applied to an ECP sub-frame of an FDD and a sub-frame of a TDD as well as the NCP sub-frame.

The number of CRS symbols and locations of the CRS symbols may be changed in a case that the interference whitening process is applied to the ECP sub-frame of the FDD and the sub-frame of the TDD.

Although FIGS. 8A and 8B illustrate another example of an interference whitening process in an LTE mobile communication system according to an example embodiment of the present disclosure, various changes could be made to FIGS. 8A and 8B. For example, although shown as a series of operations, various operations in FIGS. 8A and 8B could overlap, occur in parallel, occur in a different order, or occur multiple times.

Figure 9:
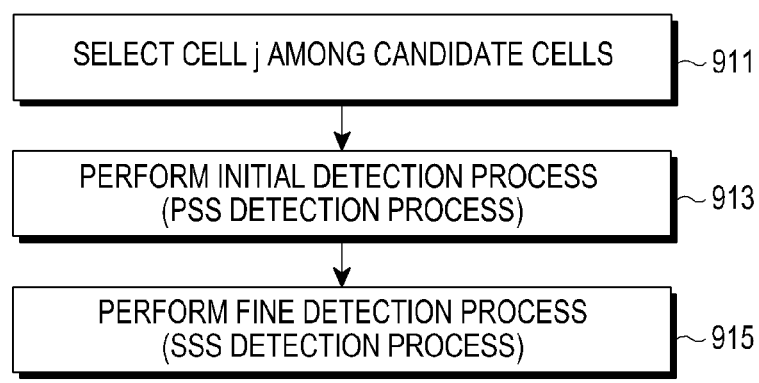
FIG. 9 schematically illustrates a process of determining a CRS group in an LTE mobile communication system according to an example embodiment of the present disclosure.

FIG. 9 schematically illustrates a process of determining a CRS group in an LTE mobile communication system according to an example embodiment of the present disclosure.

Referring to FIG. 9, a receiving apparatus may detect whether there is interference which is synchronized among different CRS groups or interference which is not synchronized among the different CRS groups. For convenience, interference which is not synchronized will be referred to as asynchronous interference. Further, the receiving apparatus may detect at which symbol timing the synchronous interference in a case of the synchronous interference or the asynchronous interference in a case of the asynchronous interference. This operation may be performed per sub-frame or may be adaptively performed if necessary.

However, if the receiving apparatus exactly knows a symbol timing offset between a neighbor interference BS and a serving BS which are asynchronous to each other, the receiving apparatus may exactly generate CRS groups. Here, the receiving apparatus may detect the symbol timing offset based on information acquired by performing timing offsets of neighbor BSs when performing a cell synchronization operation in a cell search phase included in an initial access process.

This will be described with reference to FIG. 9. Firstly, a receiving apparatus may select cell j among candidate cells at operation 911. The receiving apparatus may perform an initial detection process (e.g., a PSS detection process) at operation 913. A serving cell ID and a half frame position may be detected through the PSS detection process.

The receiving apparatus may perform a fine detection process (e.g., an SSS detection process) at operation 915. A neighbor cell ID, a type of a cyclic prefix (CP), and a frame location may be detected through the SSS detection process. For example, the type of the CP may be an NCP or an ECP.

A process including at least one of the PSS detection process or the SSS detection process may be referred to as a cell search process, a terminal may acquire cell IDs of BSs which the terminal may access, a type of a CP, and a frame location through the cell search process. Here, the frame location may be the timing offset.

The symbol timing offset may be used for performing a CRS grouping process in an asynchronous situation in an interference whitener. The cell search process may be performed on an initial access process or a periodic re-access process of the terminal, and may generate a list including cell IDs of candidate BSs and frame location information, which corresponds to each of the candidate BSs and manage the generated list.

Figure 10:
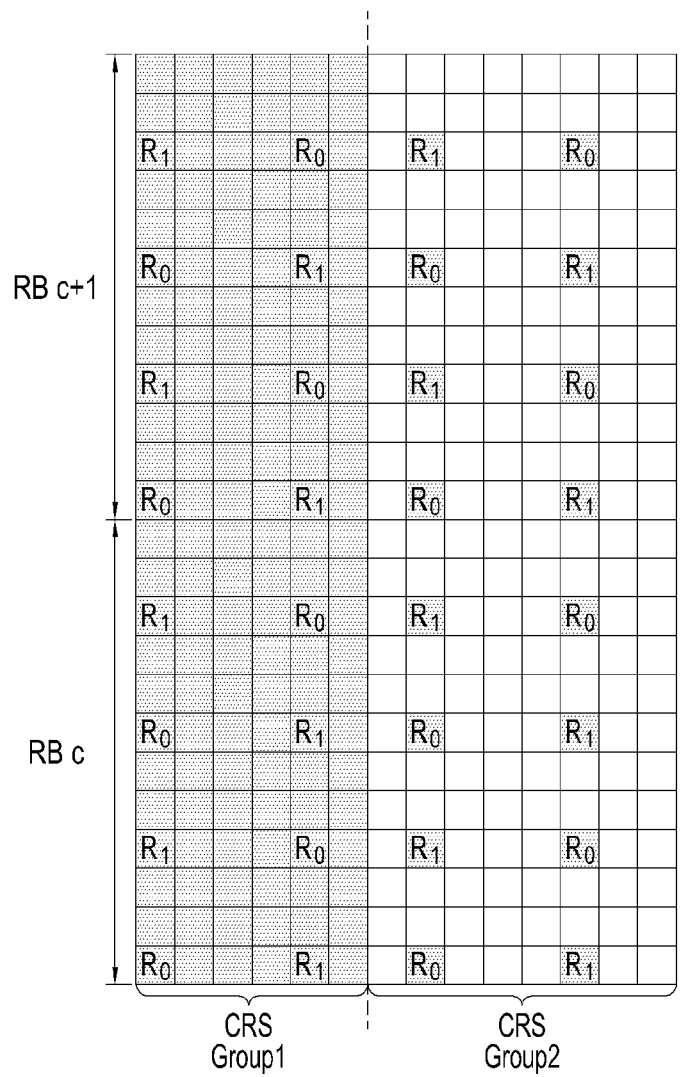
FIG. 10 schematically illustrates another example of a CRS grouping process for an interference whitening process in a sub-frame asynchronization situation in an LTE mobile communication system according to an example embodiment of the present disclosure.

FIG. 10 schematically illustrates another example of a CRS grouping process for an interference whitening process in a sub-frame asynchronization situation in an LTE mobile communication system according to an example embodiment of the present disclosure.

Referring to FIG. 10, if CRSs are divided into a plurality of CRS groups within one sub-frame, the number of CRS samples per CRS group may decrease compared to a case that the CRSs are not divided into the plurality of CRS groups. Because the number of CRS samples decreases, channel estimation performance per CRS group may be degraded.

According to this example embodiment, a CRS group may be extended in a frequency domain. Further, a plurality of adjacent resource regions in a frequency domain may be considered when generating a CRS group. In this example embodiment, channel estimation performance may increase if a neighbor cell interference signal has the same CRS structure for a plurality of resource regions. For example, a resource region may be a resource block (RB), and the RB includes at least one RE. In some example embodiments of the present disclosure, a plurality of adjacent resource regions in a frequency domain may be considered when a CRS group is generated. In some example embodiments, CRS group may be generated by considering resource regions which are not adjacent and are distributed in a frequency domain.

In some example embodiments, a CRS grouping process may be flexibly extended in a frequency domain as well as a time domain. Thus, channel estimation performance may be increased.

The CRS grouping process in FIG. 10 is a process based on a frequency domain. The CRS grouping process in FIG. 10 is a CRS grouping process in a case that a plurality of RBs (e.g., two RBs, RB c and RB c+1) are set as a CRS grouping unit. In FIG. 10, CRS samples included in one sub-frame may be divided into two CRS groups in a time domain.

In an example embodiment of the present disclosure, the number of RBs which are generated as a CRS group in a frequency domain may be determined per sub-frame or desired (or alternatively, preset) period, or may be determined if desired. In an example embodiment of the present disclosure, if interference characteristic difference among RBs is less than desired (or alternatively, preset) threshold difference, relatively many RBs may be generated as a CRS group compared to a case that the interference characteristic difference among the RBs is equal to or greater than desired (or alternatively, preset) threshold difference. Thus, the number of CRS samples included in a CRS group may be increased.

Meanwhile, a CRS grouping process illustrated in FIG. 10 may be applied to RSs such as an MRS, a DMRS, a channel status information-reference signal (CSI-RS), a CSI-IM signal, and/or the like as well as a CRS.

In an example embodiment of the present disclosure, an RS suitable for a transmission mode defined in an LTE mobile communication system may be selected, and an RS grouping process may be performed corresponding to the selected RS.

In an LTE mobile communication system, interference may be measured based on a data signal (e.g., a de-modulated data signal or a control signal). A grouping process according to this example embodiment of the present disclosure may be applied to this case. Thus, a target of a grouping process may be changed from an RS to a data signal or a control signal, and a grouping process and an interference mitigation operation thereof may be similar to a grouping process and an interference mitigation operation according to this example embodiment of the present disclosure. For example, the data signal may be a physical downlink shared channel (PDSCH) signal. For example, the control signal may be a physical downlink control channel (PDCCH) signal, or an enhanced physical downlink control channel (EPDCCH) signal.

CRS grouping processes and interference mitigation operations in an LTE mobile communication system have been described, however, a CRS grouping process and an interference mitigation operation according to example embodiments of the present disclosure may be applied to other communication systems as well as the LTE mobile communication system.

Figure 11:
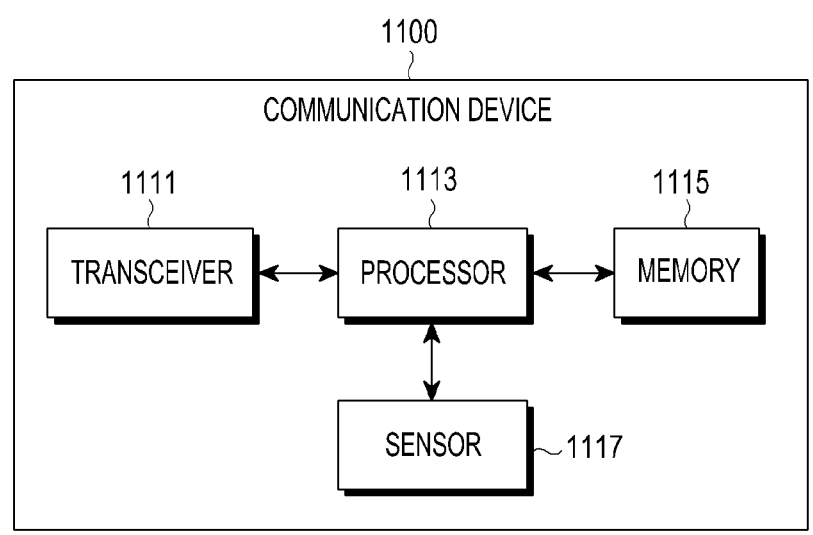
FIG. 11 schematically illustrates an example of an inner structure of a communication device in an LTE mobile communication system according to various example embodiments of the present disclosure.

FIG. 11 schematically illustrates an example of an inner structure of a communication device in an LTE mobile communication system according to various example embodiments of the present disclosure.

Referring to FIG. 11, a communication device 1100 may include a transceiver 1111, a processor 1113, a memory 1115, and a sensor 1117.

The transceiver 1111 may perform a communication operation among the communication device 1100 and external devices (e.g., a terminal other than a terminal in which the communication device 1100 is included or a BS). The terms such as "transceiver", "communication module" and "communication interface" may be interchangeably used.

The transceiver 1111 may perform a communication operation with the external devices based on various communication schemes, and this will be described below.

The transceiver 1111 may perform a communication operation with the external devices based on a wireless communication scheme, and the wireless communication scheme may include a cellular communication scheme, e.g., an LTE scheme, an LTE-A scheme, a CDMA scheme, a WCDMA scheme, a universal mobile telecommunications system (UMTS) scheme, a wireless broadband (WiBro) scheme, a global system for mobile communications (GSM) scheme, and/or the like.

The wireless communication scheme may include a short-range communication scheme, e.g., a wireless fidelity (Wi-Fi) scheme, a Bluetooth© scheme, a near field communication (NFC) scheme, a global navigation satellite system (GNSS) scheme, and the like. Here, the GNSS scheme may include at least one of a GPS, a global navigation satellite system (Glonass), a beidou navigation satellite system (Beidou), and Galileo, the European global satellite-based navigation system according to a use area, a bandwidth, and/or the like. For convenience, the terms such as "GPS" and "GNSS may be interchangeably used.

The transceiver 1111 may perform a communication operation with the external devices based on a wired communication scheme, and the wired communication scheme may include at least one of a universal serial bus (USB) scheme, a high definition multimedia interface (HDMI) scheme, a recommended standard 232 (RS-232) scheme, a plain old telephone service (POTS) scheme, and/or the like.

The transceiver 1111 may transmit and receive various signals and various messages related to an interference mitigating scheme according to various example embodiments of the present disclosure (e.g., a scheme of mitigating interference based on CRS grouping). The various signals and the various messages transmitted and received in the transceiver 1111 have been described in FIGS. 1 to 10 and a description thereof will be omitted herein.

The processor 1113 may include a communication processor (CP). According to various example embodiments of the present disclosure, the processor 1113 may include at least one of a central processing unit (CPU) and an application processor (AP). For example, the processor 1113 may perform an operation related to calculation or data processing related to a control and/or a communication of at least one other unit included in the communication device 1100. According to various example embodiments of the present disclosure, the terms such as "processor", "control module", "control unit", and "controller" may be interchangeably used in some example embodiments.

The processor 1113 may control an operation related to an interference mitigating scheme according to various example embodiments of the present disclosure. The operation related to the interference mitigating scheme according to various example embodiments of the present disclosure have been described in FIGS. 1 to 10 and a description thereof will be omitted herein.

The memory 1115 may include a volatile memory and/or a non-volatile memory. For example, the memory 1115 may store a command or data related to at least one other unit included in the communication device 1100. According to various example embodiments of the present disclosure, the memory 1115 may store a software and/or a program. For example, the program may include a kernel, a middleware, an application programming interface (API) and/or an application program (or an application), and the like. In FIG. 11, the memory 1115 is included in the communication device 1100, however, the communication device 1100 may not include the memory 1115.

The memory 1115 may store various programs, various data, and the like related to an operation related to an interference mitigating scheme according to various example embodiments of the present disclosure. The operation related to the interference mitigating scheme according to various example embodiments of the present disclosure have been described in FIGS. 1 to 10 and a description thereof will be omitted herein.

The sensor 1117 may include an inertial sensor, and the inertial sensor may include an acceleration sensor, an angular velocity sensor, a magnetic field sensor, and the like. Sensor information which is sensed in the sensor 1117 may be transferred to the processor 1113, and the processor 1113 may perform an operation related to an interference mitigating scheme according to various example embodiments of the present disclosure based on the sensor information which is transferred from the sensor 1117.

Although FIG. 11 describes the transceiver 1111, the processor 1113, the memory 1115, and the sensor 1117 as separate units in the communication device 1100, two or more of the transceiver 1111, the processor 1113, the memory 1115, and the sensor 1117 may be incorporated into a single unit.

The communication device 1100 may be implemented with one chipset.

Figure 12:
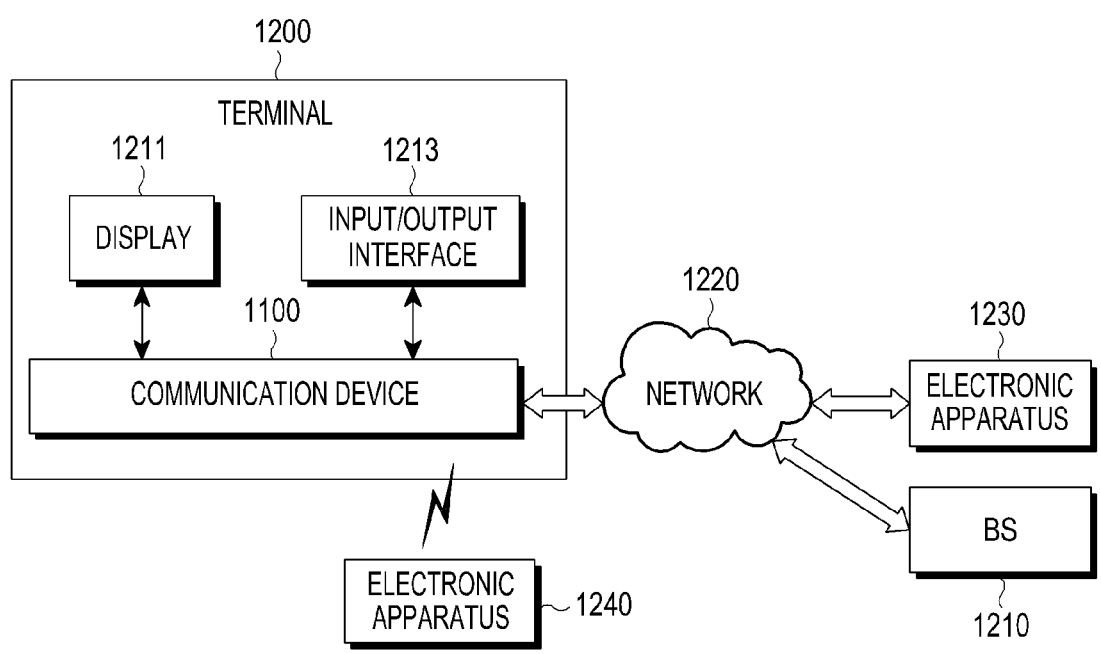
FIG. 12 schematically illustrates an example of an inner structure of a terminal included in a communication device in an LTE mobile communication system according to various example embodiments of the present disclosure.

FIG. 12 schematically illustrates an example of an inner structure of a terminal included in a communication device in an LTE mobile communication system according to various example embodiments of the present disclosure.

Referring to FIG. 12, a terminal 1200 according to various example embodiments of the present disclosure may include a communication device 1100, a display 1211, and an input/output interface 1213.

The communication device 1100 may communicate with external electronic apparatuses (e.g., an electronic apparatus 1230 and an electronic apparatus 1240, and may communicate with a BS 1210). The communication device 1100 has been described in FIG. 11 and a description thereof will be omitted herein.

The display 1211 may be implemented with various forms (e.g., a liquid crystal display (LCD), a light-emitting diode (LED) display, an organic light-emitting diode (OLED)

display, a microelectromechanical systems (MEMS) display, or an electronic paper display).

The display 1211 may display various contents, (e.g., a text, an image, a video, an icon, or a symbol). The display 1211 may include a touch screen, and receive a touch, a gesture, an approach, or a hovering input.

The input/output interface 1213 may perform a role of an interface which transfers an input command or data to other units included in the terminal 1200. The input/output interface 1213 may output a user command or data received from the other units included in the terminal 1200.

According to various example embodiments of the present disclosure, the terminal 1200 may further include a storage module (e.g., a memory), or a processor, (e.g., an Application Processor).

Although FIG. 12 describes the communication device 1100, the display 1211, and the input/output interface 1213 as separate units included in the terminal 1200 as separate units, two or more of the communication device 1100, the display 1211, and the input/output interface 1213 may be incorporated into a single unit.

The terminal 1200 may be implemented with one chipset.

Figure 13:
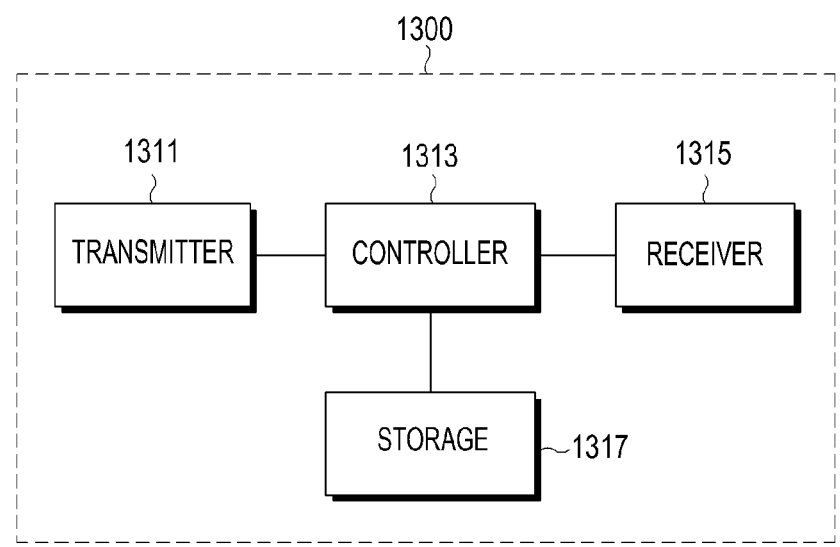
FIG. 13 schematically illustrates an example of an inner structure of a BS in an LTE mobile communication system according to various example embodiments of the present disclosure.

FIG. 13 schematically illustrates an example of an inner structure of a BS in an LTE mobile communication system according to various example embodiments of the present disclosure.

Referring to FIG. 13, a BS 1300 may include a transmitter 1311, a controller 1313, a receiver 1315, and a storage 1317.

The controller 1313 may control the overall operation of the BS 1300. For example, the controller 1313 may control the BS 1300 to perform an operation related to an interference mitigating scheme (e.g., a scheme of mitigating interference based on CRS grouping) according to various example embodiments of the present disclosure. The operation related to the interference mitigating scheme according to various example embodiments of the present disclosure may be performed in the manner described with reference to FIGS. 1 to 10, and a description thereof will be omitted herein.

The transmitter 1311 may transmit various signals and various messages, and the like to other entities (e.g., a communication device) under a control of the controller 1313. The various signals, the various messages, and the like transmitted from the transmitter 1311 have been described in FIGS. 1 to 10 and a description thereof will be omitted herein.

The receiver 1315 may receive various signals, various messages, and the like from the other entities under a control of the controller 1313. The various signals, the various messages, and the like received by the receiver 1315 have been described in FIGS. 1 to 10 and a description thereof will be omitted herein.

The storage 1317 may store a program related to the operation related to the interference mitigating scheme according to various example embodiments of the present disclosure which the BS 1300 performs under a control of the controller 1313, various data, and/or the like.

The storage 1317 may store the various signals and the various messages which the receiver 1315 receives from the other entities, and/or the like.

Although FIG. 13 describes the transmitter 1311, the controller 1313, the receiver 1315, and the storage unit 1317 as separate units included in the BS 1300, two or more of the transmitter 1311, the controller 1313, the receiver 1315, and the storage unit 1317 may be incorporated into a single unit.

The BS 1300 may be implemented with one processor or one chipset.

Certain aspects of the present disclosure may also be embodied as computer readable code on a non-transitory computer readable recording medium. A non-transitory computer readable recording medium may be any data storage device that can store data, which can be thereafter read by a computer system. Examples of the non-transitory computer readable recording medium may include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

Methods and/or apparatuses according to example embodiments of the present disclosure may be implemented by hardware, software and/or a combination thereof. The software may be stored in a non-volatile storage (e.g., an erasable or re-writable ROM), a memory (e.g., a RAM, a memory chip, a memory device, or a memory integrated circuit (IC)), or an optically or magnetically recordable non-transitory machine-readable (e.g., computer-readable), storage medium (e.g., a compact disk (CD), a digital video disc (DVD), a magnetic disk, or a magnetic tape). A method and apparatus according to some example embodiments of the present disclosure may be implemented by a computer or a mobile terminal that includes a controller and a memory, and the memory may be an example of a non-transitory machine-readable (e.g., computer-readable), storage medium suitable to store a program or programs including instructions for implementing various example embodiments of the present disclosure.

The present disclosure may include a program including code for implementing the apparatuses and/or methods as defined by the appended claims, and a non-transitory machine-readable (e.g., computer-readable) storage medium storing the program. The program may be electronically transferred via any media (e.g., communication signals, which are transmitted through wired and/or wireless connections), and the present disclosure may include their equivalents.

An apparatus according to some example embodiments of the present disclosure may receive the program from a program providing device, which is connected to the apparatus in a wired or wireless manner and is configured to store the program. The program providing device may include a memory for storing instructions which instruct to perform a content protect method which has been already installed, information desired for the content protection method, a communication circuitry for performing a wired or a wireless communication with a graphic processing device, and a controller for transmitting a related program to a transmitting/receiving device based on a request of the graphic processing device or transmitting the related program to the transmitting/receiving device automatically.

While the present disclosure has been shown and described with reference to various example embodiments thereof, it will be understood by those skilled in the art that various changes in form and details may be made therein without departing from the spirit and scope of the present disclosure as defined by the appended claims and their equivalents.

What is claimed is:

1. A chipset, configured to:
   receive a signal, a sub-frame of which is a two-dimensional signal pattern alternating at least a first reference signal region and a second reference signal region;
   generate groups by dividing the sub-frame of the signal by a first time interval occupied by the first reference signal region, by dividing the sub-frame of the signal by a first frequency band occupied by the first reference signal region, or by dividing the sub-frame of the signal by a second time interval occupied by the second reference signal region;
   detect an interference characteristic of a neighbor cell corresponding to one of the groups; and
   perform an interference whitening operation for the one of the groups based on the interference characteristic,
   wherein a second frequency band occupied by the second reference signal region is wider than the first frequency band occupied by the first reference signal region.

2. The chipset of claim 1, where the chipset is configured to generate the groups
   per time interval identical to one of the first time interval occupied by the first reference signal region or a set period, or
   in response to an occurrence of a specific event.

3. The chipset of claim 1, wherein the chipset is configured to generate the groups based on a difference between first time synchronization of the neighbor cell and second time synchronization of a serving cell.

4. The chipset of claim 1, wherein the chipset is further configured to
   detect a covariance matrix for each of the groups based on a received signal and a channel matrix,
   detect a whitening filter coefficient for each of the groups based on the covariance matrix, and
   perform the interference whitening operation for the received signal and the channel matrix.

5. The chipset of claim 1, wherein
   each of the groups includes at least one sample used for estimating the interference characteristic of the neighbor cell, and
   the at least one sample includes at least one of a reference signal, a data signal, or a control signal.

6. The chipset of claim 5, wherein
   the reference signal includes one of a common reference signal (CRS), a demodulation reference signal (DMRS), a multimedia broadcast multicast service single frequency network reference signal (MRS), a channel status information interference measurement (CSI-IM) signal, or a channel status information-reference signal (CSI-RS),
   the data signal includes a physical downlink shared channel (PDSCH) signal, and
   the control signal includes one of a physical downlink control channel (PDCCH) signal or an enhanced physical downlink control channel (EPDCCH) signal.

7. The chipset of claim 1, wherein the chipset is further configured to
   detect a covariance matrix for each of the groups based on a plurality of symbols, a plurality of antenna ports transmitted in the first reference signal region, and a plurality of reference signal samples transmitted in each of the plurality of symbols if a time interval occupied by each of the groups includes the plurality of symbols,
   detect a whitening filter coefficient for each of the groups based on the covariance matrix, and
   perform the interference whitening operation for a received signal and a channel matrix based on the detected whitening filter coefficients.

8. The chipset of claim 1, wherein
   the second frequency band occupied by the second reference signal region increases in response to a difference among interference characteristics of resource blocks (RBs) being less than a threshold value, and
   the RBs include the first time interval occupied by the first reference signal region and a resource region occupied by the first frequency band, which is occupied by the first reference signal region.

9. An operating method of an apparatus for mitigating interference, the operating method comprising:
   receiving a signal, a sub-frame of which is a two-dimensional signal pattern alternating at least a first reference signal region and a second reference signal region;
   generating groups by dividing the sub-frame of the signal by a first time interval occupied by the first reference signal region, by dividing the sub-frame of the signal by a first frequency band occupied by the first reference signal region, or by dividing the sub-frame of the signal by a second time interval occupied by the second reference signal region;
   detecting an interference characteristic of a neighbor cell corresponding to one of the groups; and
   performing an interference whitening operation based on the interference characteristic,
   wherein a second frequency band occupied by the second reference signal region is wider than the first frequency band occupied by the first reference signal region.

10. The operating method of claim 9, wherein
    the groups are generated per time interval identical to the first time interval occupied by the first reference signal region or preset period, or
    the groups are generated in response to an occurrence of a specific event.

11. The operating method of claim 9, wherein the groups are generated based on difference between first time synchronization of the neighbor cell and second time synchronization of a serving cell.

12. The operating method of claim 9, wherein the performing the interference whitening operation comprises:
    detecting a covariance matrix for each of the groups based on a received signal and a channel matrix;
    detecting a whitening filter coefficient for each of the groups based on the covariance matrix; and
    performing the interference whitening operation for the received signal and the channel matrix.

13. The operating method of claim 9, wherein
    each of the groups includes at least one sample used for estimating the interference characteristic of the neighbor cell, and
    the at least one sample includes at least one of a reference signal, a data signal, or a control signal.

14. The operating method of claim 9, wherein the performing the interference whitening operation comprises:
    detecting a covariance matrix for each of the groups based on a plurality of symbols, a plurality of antenna ports transmitted in the first reference signal region, and a plurality of reference signal samples transmitted in each of the plurality of symbols if a time interval occupied by each of the groups includes the plurality of symbols;
    detecting a whitening filter coefficient for each of the groups based on the covariance matrix; and performing the interference whitening operation for a received signal and a channel matrix based on the detected whitening filter coefficients.

15. The operating method of claim 9, wherein the second frequency band occupied by the second reference signal region increases in response to a difference among interference characteristics of resource blocks (RBs) being less than a threshold value, and wherein the RBs include the first time interval occupied by the first reference signal region and a resource region occupied by the first frequency band, which is occupied by the first reference signal region.

16. A chipset for mitigating interference, the chipset comprising:

a memory configured to store at least one of computer-readable instructions or computer-readable data; and at least one processor configured to execute the computer-readable instructions such that the at least one processor is configured to, receive a signal, a sub-frame of which is a two-dimensional signal pattern alternating at least a first reference signal region and a second reference signal region;

generate groups by dividing the sub-frame of the signal by a first time interval occupied by the first reference signal region, by dividing the sub-frame of the signal by a first frequency band occupied by the first reference signal region, or by dividing the sub-frame of the signal by a second time interval occupied by the second reference signal region, a second frequency band occupied by the second reference signal region being wider than the first frequency band occupied by the first reference signal region, detect an interference characteristic of a neighbor cell corresponding to one of the groups, and perform an interference whitening operation for each of the groups based on the interference characteristic.

17. The chipset of claim 16 further comprising:

a transceiver configured to transmit or receive signals.

18. The chipset of claim 16, wherein the at least one processor is further configured to, generate the groups per time interval identical to one of the first time interval occupied by the first reference signal region or a set period, or generate the groups in response to an occurrence of a specific event.

19. The chipset of claim 16, wherein the at least one processor is further configured to generate the groups based on a difference between first time synchronization of the neighbor cell and second time synchronization of a serving cell.

20. The chipset of claim 16, wherein the at least one processor is further configured to, detect a covariance matrix for each of the groups based on a received signal and a channel matrix, detect a whitening filter coefficient for each of the groups based on the covariance matrix, and perform the interference whitening operation for the received signal and the channel matrix.

* * * * *